United States Patent
Bunting et al.

(10) Patent No.: US 6,901,751 B2
(45) Date of Patent: Jun. 7, 2005

(54) SYSTEM FOR CONTROLLING PARTICULATE FILTER TEMPERATURE

(75) Inventors: Bruce G. Bunting, Columbus, IN (US);
Paul R. Miller, Columbus, IN (US);
Bradlee J. Stoia, Columbus, IN (US);
S. Arvind Suresh, Columbus, IN (US);
Rod Radovanovic, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 70 days.

(21) Appl. No.: 10/062,385

(22) Filed: Feb. 1, 2002

(65) Prior Publication Data

US 2003/0145582 A1 Aug. 7, 2003

(51) Int. Cl.[7] ............................................. F01N 3/00
(52) U.S. Cl. .................... 60/297; 60/274; 60/285; 60/295; 60/311; 180/65.1; 180/65.2; 180/65.4
(58) Field of Search .......................... 60/274, 284, 285, 60/295, 297, 311; 180/65.1, 65.2, 65.3, 65.4

(56) References Cited

U.S. PATENT DOCUMENTS

| | | |
|---|---|---|
| 3,791,473 A | 2/1974 | Rosen |
| 4,021,677 A | 5/1977 | Rosen et al. |
| 4,305,254 A | 12/1981 | Kawakatsu et al. |
| 4,335,429 A | 6/1982 | Kawakatsu |
| 4,407,132 A | 10/1983 | Kawakatsu et al. |
| 4,520,624 A * | 6/1985 | Kiyota et al. .................. 60/286 |
| 4,702,075 A | 10/1987 | Jenny |
| 4,719,751 A | 1/1988 | Kume et al. |
| 4,835,964 A | 6/1989 | Kume et al. |
| 4,914,065 A | 4/1990 | Hijikata et al. |
| 5,042,248 A | 8/1991 | Abthoff et al. |
| 5,052,178 A | 10/1991 | Clerc et al. |
| 5,063,736 A * | 11/1991 | Hough et al. .................. 60/286 |
| 5,081,365 A | 1/1992 | Field et al. |
| 5,218,818 A | 6/1993 | Ahmann |
| 5,327,992 A | 7/1994 | Boll |
| 5,440,880 A | 8/1995 | Ceynow et al. |
| 5,582,002 A | 12/1996 | Pattas |
| 5,716,586 A * | 2/1998 | Taniguchi ..................... 60/285 |
| 5,826,425 A | 10/1998 | Sebastiano et al. |
| 5,956,942 A | 9/1999 | Sebastiano et al. |
| 6,032,461 A * | 3/2000 | Kinugasa et al. .............. 60/295 |
| 6,195,985 B1 | 3/2001 | del Re et al. |
| 6,421,599 B1 * | 7/2002 | Lippa et al. ................. 701/102 |
| 6,422,001 B1 * | 7/2002 | Sherman et al. .............. 60/274 |

FOREIGN PATENT DOCUMENTS

| | | |
|---|---|---|
| EP | 196421 A2 | 2/1986 |
| EP | 0 411 445 A2 | 7/1990 |
| GB | 2 229 937 A | 3/1990 |

* cited by examiner

*Primary Examiner*—Binh Q. Tran
(74) *Attorney, Agent, or Firm*—Barnes & Thornburg

(57) ABSTRACT

A system for controlling the temperature of a particulate filter coupled to an exhaust outlet of an internal combustion engine includes a controller responsive to volumetric flow and temperature of exhaust gas to determine a filter regeneration parameter. In a hybrid electric-engine vehicle application, various control strategies are implemented as a function of the regeneration parameter to control exhaust gas temperature suitably for proper regeneration of the particulate filter. Such strategies include shifting the duty cycle of the engine toward lower engine speed operation along lines of constant power output, modifying the ratio of electrical power and engine power and controlling recharging of the battery supplying electrical energy to the vehicle's electric drive motor under vehicle deceleration conditions. In vehicle applications including a transmission coupled directly to the engine, shift points of the transmission are modified as a function of the regeneration parameter to control exhaust gas temperature.

23 Claims, 14 Drawing Sheets

SYSTEM FOR CONTROLLING PARTICULATE FILTER TEMPERATURE

FIELD OF THE INVENTION

The present invention relates generally to controlling the temperature of a particulate filter disposed within a stream of exhaust gas produced by an internal combustion engine, and more specifically to such applications wherein the particulate filter temperature is controlled in a manner that encourages frequent and/or complete regeneration thereof.

BACKGROUND OF THE INVENTION

Allowable limits of particulates and noxious gases produced by internal combustion engines, including those produced by diesel engines, are generally regulated by the Environmental Protection Agency (EPA). Manufacturers of such engines have accordingly devised techniques for controlling exhaust emissions, and with regard to particulate emissions many now include within the exhaust system a particulate filter or trap, sometimes referred to as a soot filter. Particulate filters are generally designed to collect particulate emissions within the exhaust stream and either continuously or periodically burn off the collected particulates in a so-called particulate filter regeneration mode. In the particulate filter regeneration mode, the temperature of the filter must typically be above a specified regeneration temperature to ensure thorough burning of the collected particulates.

Particulate filters generally fall into two broad categories; namely active and passive. Active particulate filters conventionally include one or more heaters or heating systems that may be selectively controlled in order to control filter temperature, and, in turn, filter regeneration. Passive particulate filters, on the other hand, rely strictly on the temperature of the exhaust gas produced by the engine to elevate the filter temperature sufficiently for filter regeneration.

So-called "hybrid" vehicles are known and typically comprise an internal combustion engine and an electrical motor/generator system, wherein the vehicle driving power is selectively provided under various operating conditions by either one or a combination of these two power sources. For example, under normal operating conditions with a fully charged electrical system, the vehicle driving power is typically provided as a variable ratio of engine and electrical system power. Under vehicle braking conditions and at times when the electrical system is in need of a recharge, one or more generators is typically responsive to rotation of the driveshaft to recharge or regenerate the electrical system.

In conventional internal combustion engine applications, such as in over-the-road trucks and the like, particulate filter temperature is generally controlled solely by the temperature of exhaust gases produced the engine during normal operation thereof. In generally, particulate filters in such applications are typically designed such that "normal" operation of the engine produces exhaust temperatures at or above the particulate filter regeneration temperature with sufficient frequency and duration to avoid particulate build up within the filter.

However, under certain engine operating conditions, such as extended periods of engine idling, sustained operation at high engine speeds and low output torque, and the like, exhaust gas temperatures produced by the engine can be below the filter regeneration temperature for extended periods of time, thereby allowing build up of particulate matter therein. In hybrid internal combustion engine-electrical motor/generation systems of the type described hereinabove, exhaust temperatures produced under normal operation of the engine in such systems likewise may not achieve the particulate filter regeneration temperature with sufficient frequency and/or with sufficient duration to completely regenerate the particulate filter as often as may be required. As a result, particulate filters in either of these applications may frequently become clogged or plugged, thereby requiring unscheduled vehicle maintenance in order to clean the clogged or plugged element. Particulate filter clogging or plugging may also result in filter failure through generation of excessive temperatures internal to the filter when soot is burned.

What is therefore needed is a system for controlling particulate filter temperature in a manner that encourages frequent and/or complete regeneration of the particulate filter so as to reduce the likelihood of filter clogging or plugging and correspondingly reduce vehicle down time required to service the clogged or plugged particulate filter.

SUMMARY OF THE INVENTION

The foregoing shortcomings of the prior art are addressed by the present invention. In accordance with one aspect of the present invention, a system for controlling particulate filter temperature comprises an internal combustion engine producing exhaust gas at an exhaust gas port, a particulate filter having an inlet fluidly coupled to the exhaust port of the engine and an outlet, means for determining a pressure differential between the inlet and the outlet of the particulate filter, means for determining a volumetric flow rate of the exhaust gas entering the inlet of the particulate filter, and a control circuit determining a regeneration parameter as a function of the pressure differential and the volumetric flow rate, the control circuit controlling temperature of the particulate filter as a function of the regeneration parameter.

In accordance with another aspect of the present invention, a method of controlling the temperature of a particulate filter coupled to an exhaust port of an internal combustion engine comprises the steps of determining a pressure differential across the particulate filter, determining a volumetric flow rate of exhaust gas entering the particulate filter, determining a regeneration parameter as a function of the pressure differential and the volumetric flow rate, and controlling temperature of the particulate filter as a function of the regeneration parameter.

In accordance with yet another aspect of the present invention, a system for controlling particulate filter temperature comprises an internal combustion engine producing exhaust gas at an exhaust gas port, a particulate filter having an inlet fluidly coupled to the exhaust port of the engine and an outlet, means for determining a temperature of the particulate filter, and a control circuit controlling rotational speed of the engine between an idle speed and a maximum speed, the control circuit increasing the idle speed if the temperature of the particulate filter exceeds a first temperature to thereby cool the particulate filter by increasing exhaust gas flow therethrough.

In accordance with still another aspect of the present invention, a method of controlling the temperature of a particulate filter coupled to an exhaust port of an internal combustion engine operating at rotational speeds between an idle speed and a maximum speed comprises the steps of determining a temperature of the particulate filter, and increasing the idle speed if the temperature of the particulate filter exceeds a first temperature to thereby cool the particulate filter by increasing a flow rate of engine exhaust gas therethrough.

In accordance with a further aspect of the present invention, a system for controlling particulate filter temperature comprises an internal combustion engine producing exhaust gas at an exhaust gas port, a particulate filter having an inlet fluidly coupled to the exhaust port of the engine and an outlet, means for determining a temperature of the particulate filter, a transmission coupled to the engine and having a number of automatically selectable gear ratios, and a control circuit responsive to the temperature of the particulate filter exceeding a first temperature to command automatic shifting of the transmission according to a shift schedule having higher engine speed shift points than those of a default engine speed shift point schedule, the engine resultantly operating at higher engine speeds with correspondingly higher exhaust gas flow through the particulate filter to thereby cool the particulate filter.

In accordance with yet a further aspect of the present invention, a method of controlling the temperature of a particulate filter coupled to an exhaust port of an internal combustion engine coupled to a transmission having a number of automatically selectable gear ratios comprises the steps of determining a temperature of the particulate filter, and commanding automatic shifting of the transmission according to a shift schedule having higher engine speed shift points than those of a default engine speed shift point schedule if the temperature of the particulate filter exceeds a first temperature, causing the engine to resultantly operate at higher engine speeds with correspondingly higher exhaust gas flow through the particulate filter to thereby cool the particulate filter.

The present invention provides a system for controlling the temperature of a particulate filter in a manner that protects the filter from damage resulting from excessively high temperatures and also in a manner that promotes appropriate filter regeneration under various operating conditions.

The present invention further provides one embodiment of such a system that is particularly suited for use with a hybrid engine-electric vehicle application.

The present invention also provides another embodiment of such a system that is particularly suited for use with an engine having a transmission coupled thereto, wherein the transmission includes a number of automatically selectable gear ratio.

These and other objects of the present invention will become more apparent from the following description of the preferred embodiment.

DESCRIPTION OF THE PREFERRED EMBODIMENTS

Figure 1:
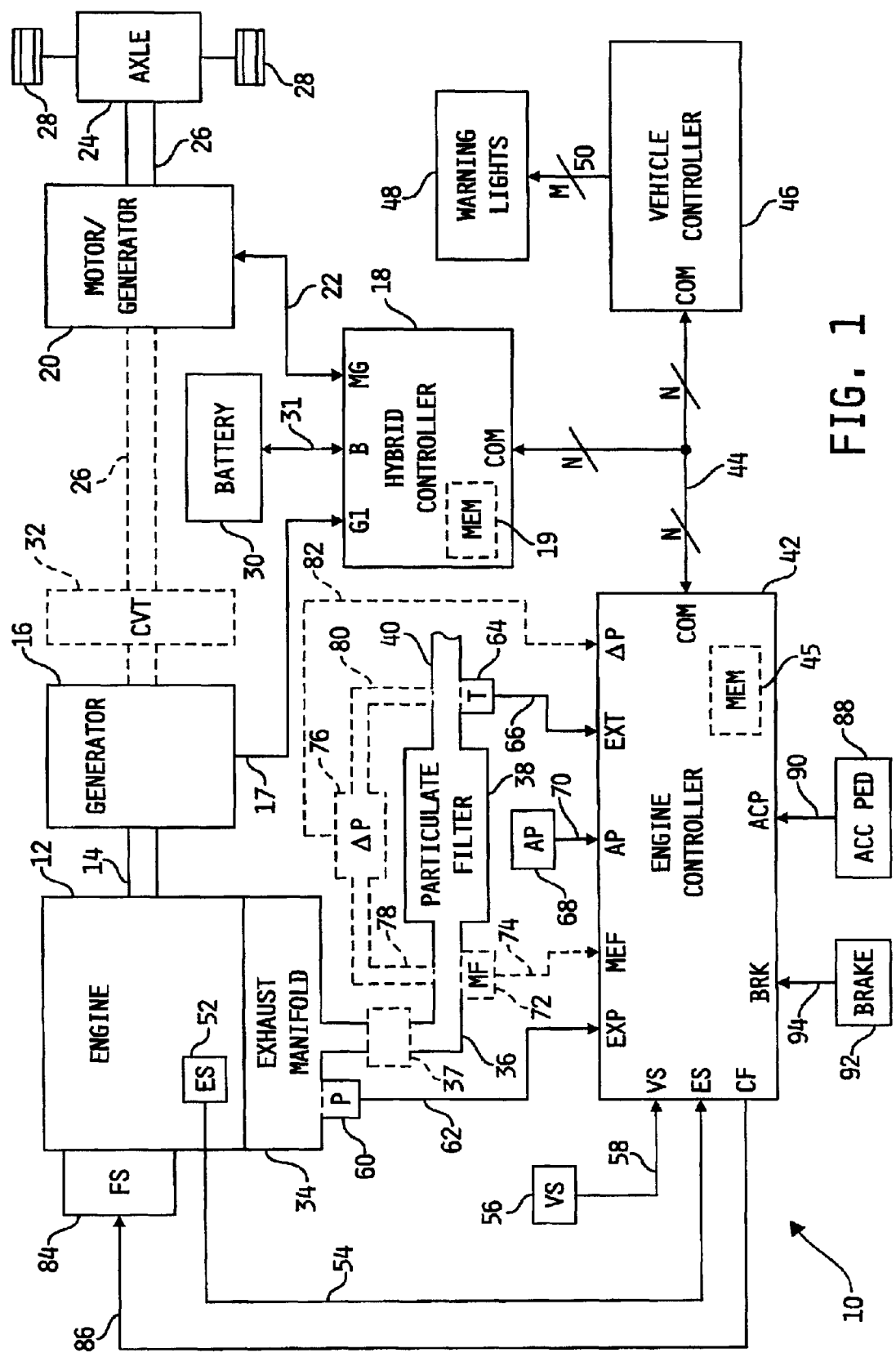
FIG. 1 is a diagrammatic illustration of one preferred embodiment of a system for controlling particulate filter temperature in a hybrid engine-electric vehicle application, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for controlling particulate filter temperature in a hybrid-engine electric vehicle application, in accordance with the present invention, as shown. System 10 includes an internal combustion engine 12 coupled to a generator 16 via drive shaft 14. Generator 16 may be of known construction and is responsive to rotation of drive shaft 14 to supply electrical energy to a first generator input (G1) of a hybrid controller 18 via signal path 17. A motor/generator 20 is mechanically coupled to a drive axle via driveshaft 26, and the axle 24 is coupled to a number of wheels 28 of the vehicle. Motor/generator 20 is electrically connected to a motor/generator port (MG) of hybrid controller 18 via signal path 22. A rechargeable battery 30, or other rechargeable energy source of known construction, is electrically connected to a battery port (B) of hybrid controller 18 via signal path 31.

A communications port (COM) of hybrid controller 18 is electrically connected to a similar communications port COM of an engine controller 42 via a number, N, of signal paths 44, wherein N may be any positive integer. In one embodiment, hybrid controller 18 and engine controller 42 are of known construction and are each microprocessor based, and wherein engine controller 42 includes a memory unit 45 and hybrid controller 18 includes a memory unit 19. It is to be understood that hybrid controller 18 and/or engine controller 42 may alternatively be any general purpose control circuit configured to operate in a manner to be more fully described hereinafter.

In one embodiment, signal paths 44 are implemented as a serial data communications link, and hybrid controller 18 and engine controller 42 are configured to communicate via serial communications data link 44 in accordance with a known communications protocol. Examples of suitable communications protocols include, but are not limited to, SAE-J1939, SAE-J1587, CAN, or the like. In alternative embodiments, signal paths 44 may be implemented in accordance with other known serial or parallel data communication schemes.

Engine controller 42 includes a commanded fueling output (CF), electrically connected to a fuel system 84 of engine 12 via signal path 86. Engine controller 42 is operable, as is known in the art, to supply a fueling command to fuel system 84 via signal path 86, wherein fuel system 84 is responsive to such commands to supply corresponding amounts of fuel to engine 12.

Hybrid controller 18 is configured in a known manner to control the ratio of electrical power supplied by battery 30 and engine power supplied by engine 12. In a motor operational mode, motor/generator 20 is responsive to electrical energy supplied by battery 30 via hybrid controller 18 to impart driving force to the wheels 28 via drive shaft 26 and axle 24. Hybrid controller 18 is operable to monitor the charge on battery 30, and to control recharging thereof as needed via one of two sources. A primary battery recharging source is generator 16, and hybrid controller 18 is configured to control the operation of generator 16 by requesting appropriate amounts of engine output torque. In the embodiment shown in FIG. 1, hybrid controller 18 is operable to supply such engine output torque requests to engine controller 42 via signal paths 44, and engine controller 42 is, in turn, operable to implement such torque requests by supplying corresponding fueling commands to fuel system 84 of engine 12. In this manner, engine 12 is operable to supply varying amounts of engine output torque to generator 16 under the control of hybrid controller 18, wherein generator 16 is responsive to such varying engine output torque amounts via shaft 14 to supply corresponding amounts of recharging energy to battery 30. A secondary battery recharging source is motor/generator 20 operating in a generator mode, wherein motor/generator 20 is responsive to torque supplied thereto via drive shaft 26 under vehicle braking and/or other vehicle motoring conditions, to supply recharging electrical energy to battery 30 via hybrid controller 18.

In one embodiment of system 10, the drivetrain of the hybrid engine-electric vehicle is implemented as a so-called "series" drive system as just described. In a series drive system, the wheels 28 are driven solely by motor/generator 20 under electrical power supplied by battery 30. In this embodiment, engine 12 is controlled only in a manner necessary to maintain appropriate charge on battery 30. In an alternate embodiment, as shown in phantom in FIG. 1, engine drive shaft 14 extends through generator 16 and is mechanically coupled to a suitable transmission such as a continuous-variable transmission (CVT) 32. Drive shaft 26 likewise extends through motor/generator 20 and is coupled to an output of transmission 32. In this alternate embodiment, the drivetrain of the hybrid engine-electric vehicle is implemented in a so-called "parallel" drive system configuration wherein the wheels 28 of the vehicle may be driven by motor/generator 20 from electrical power supply by battery 30 and/or may be driven directly by engine 12 via transmission 32. It will be appreciated that the combination of the generator 16, transmission 32 and motor/generator 20 can alternatively be combined in configurations other than that shown in FIG. 1, and/or that the motor/generator 20 may be combined with transmission 32 to form a fully integrated system.

In either case, engine 12 includes an exhaust manifold 34 having an exhaust conduit 36 extending therefrom. In one embodiment, a particular filter 38 has an inlet fluidly coupled to exhaust conduit 36 and an outlet fluidly coupled to another exhaust conduit 40. Alternatively, as shown in phantom in FIG. 1, exhaust conduit 36 may have a turbocharger turbine 37 disposed in-line therewith, such that the outlet of exhaust conduit 36 represents the exhaust gas outlet of turbocharger turbine 37. In either case, exhaust conduit 36 generally represents an exhaust outlet to which the inlet of particulate filter 38 is coupled. Particulate filter 38 is sometimes referred to in the art as a particulate trap or soot trap, and is in any case operable to collect particulates above a predefined size that are carried by the exhaust gas produced by engine 12.

System 10 includes a number of sensors and/or sensing systems operable to provide information relating to the operation of engine 12 and its components. For example, engine 12 includes an engine speed sensor 52 electrically connected to an engine speed input (ES), of engine controller 42 via signal path 54. In one embodiment, engine speed sensor 52 is a Hall effect sensor operable to sense passage thereby of a number of teeth formed on a gear or tone wheel rotating synchronously with the engine crank shaft. Alternatively, engine speed sensor 52 may be another known sensor, such as a variable reluctance sensor or the like, and is in any case configured to produce a signal on signal path 54 representative of the rotational speed of engine 12. System 10 further includes a vehicle speed sensor 56 electrically connected to a vehicle speed in put (VS), of engine controller 42 via signal path 58. In one embodiment, vehicle speed sensor 56 is a variable reluctant sensor operable to sense rotational speed of drive shaft 26, although the present invention contemplates other sensors configured to determine vehicle speed such as a wheel speed sensor or the like. As it relates to the present invention, any such sensor is operable to provide engine controller 42 with a vehicle speed signal representative of the road speed of the vehicle carrying engine 12.

System 10 further includes a pressure sensor 60 of known construction and electrically connected to an exhaust pressure input (EXP) of engine controller 42 via signal path 62. In embodiments that do not include a turbocharger turbine 37 disposed in-line with exhaust conduit 36, sensor 60 may be disposed in fluid communication with the exhaust manifold 34, as shown in FIG. 1, or may alternatively be disposed in fluid communication with exhaust conduit 36 at any suitable location. In embodiments that include turbocharger turbine 37 disposed in-line with exhaust conduit 36, it is desirable to locate sensor 60 in fluid communication with either the turbocharger turbine 37 or a portion of the exhaust conduit 36 extending between turbine 37 and particulate filter 38. In any case, the pressure sensor 60 will be described hereinafter as being fluidly coupled to an exhaust outlet of the engine 12, it being understood that such a description is intended to encompass any of the arrangements just described. In operation, sensor 60 is operable to provide engine controller 42 with a pressure signal indicative of the pressure of exhaust gas supplied to particulate filter 38. Alternatively, engine controller 42 may include one or more known software algorithms for determining or estimating exhaust gas pressure based on other engine operating conditions. In this embodiment, pressure sensor 60 may be omitted, or may be alternatively included to provide redundant pressure information. System 10 further includes an atmospheric pressure sensor 68 electrically connected to an atmospheric pressure input (AP) of engine controller 42 via signal path 70. Sensor 68 may be of known construction and is operable to produce a pressure signal indicative of ambient air surrounding the vehicle carrying engine 12. As they relate to the present invention, pressure sensors 60 and 68 are used in one illustrative embodiment to determine a pressure differential across particulate filter 38, the purpose of which will be more fully described hereinafter. In this regard, the present invention contemplates that pressure sensors 60 and 68 may alternatively be replaced by a differential pressure sensor 76 having one input fluidly coupled to exhaust outlet 36 via conduit 78 and a second input fluidly coupled to exhaust conduit 40 via conduit 80 as shown in phantom in FIG. 1. In this embodiment, the differential (P) pressure sensor 70 is electrically connected to a P input of engine controller 42 via signal path 82, wherein sensor 76 is operable to provide a differential pressure signal directly to engine controller 42 that is representative of the pressure differential across the particulate filter 38.

System 10 further includes a temperature sensor 64 disposed in fluid communication with exhaust conduit 40 and electrically connected to an exhaust temperature input (EXT) of engine controller 42 via signal path 66. Temperature sensor 64 may be of known construction and is operable to produce a temperature signal indicative of the temperature of the exhaust gas exiting the particulate filter 38. Alternatively, the present invention contemplates that the temperature sensor 64 may be disposed in fluid communication with the exhaust gas flowing through particulate filter 38, or alternatively still affixed to the particulate filter 38 to produce a temperature signal indicative of the temperature effect on filter 38 of exhaust gas flowing there through.

Engine controller 42 is operable, as is known in the art, to determine an engine load value representative of the load currently being borne by engine 12. In one embodiment, engine controller 42 is operable to compute engine load as a ratio of currently commanded fueling and full load fueling as is known in the art, although the present invention contemplates computing engine load in accordance with any other known technique therefor. In accordance with the present invention, engine controller 42 is operable to determine a volumetric flow rate of exhaust gas through the particulate filter 38, wherein this volumetric flow rate of exhaust gas through the particulate filter 38 is a function of engine speed, engine load and exhaust gas temperature produced by temperature sensor 64 in units of actual cubic feet per minute (ACFM) or other suitable flow units. In this regard, the present invention contemplates that system 10 may alternatively include a mass flow sensor 72 disposed in fluid communication with exhaust outlet 36 (or exhaust conduit 40) as shown in phantom in FIG. 1. In this embodiment, sensor 72 is electrically connected to a mass exhaust flow input (MEF) of engine controller 42 via signal path 74. In addition to, or in place of, the volumetric flow rate through the particulate filter 38 computed as a function of engine speed, engine load and exhaust gas temperature produced by temperature sensor 64, the mass flow signal produced by mass flow sensor 72 may be used to provide similar and/or redundant exhaust gas flow rate information. Alternatively still, mass flow sensor 72 may be disposed in fluid communication with an air intake system of engine 12 (not shown), wherein exhaust gas flow may be computed in accordance with well-known equations relating exhaust gas flow to intake air flow and fuel flow.

System 10 further includes a brake sensor 92 mechanically coupled to a service brake of the vehicle carrying engine 12, and electrically connected to a brake input (BRK) of engine controller 42 via signal path 94. Brake sensor 92 may be implemented as a pressure switch or other known brake sensor operable to provide a signal to engine controller 42 representative of the status of the service brake; i.e. whether or not it is being actuated. Alternatively, brake sensor 92 may be implemented as a pressure or travel sensor producing a signal indicative of service brake pressure, travel, percent deflection or the like. In any case, an accelerator pedal sensor 88 is also included and is mechanically coupled to an accelerator pedal (not shown) and electrically connected to an accelerator pedal input (ACP) of engine controller 42 via signal path 90. Accelerator pedal sensor 88 may be a pressure switch, potentiometer, or other known accelerator pedal sensor operable to provide a signal to engine controller 42 indicative of whether or not the accelerator pedal is being depressed and/or to what degree it is being depressed.

It is to be understood that any one or more of the foregoing sensors and/or sensing systems may alternatively be provided as inputs to hybrid controller 18 without detracting from the scope of the present invention. Regardless of whether any one or more of the sensors and/or sensing systems is electrically connected to engine controller 42 or hybrid controller 18, those skilled in the art will recognize that any information provided thereby may be shared between controllers 18 and 42 via communications link 44.

System 10 further includes a vehicle controller 46 having a communications port (COM) electrically connected to signal paths 44. Vehicle controller 46 is, in one embodiment, microprocessor-based, although the present invention contemplates that vehicle controller 46 may alternatively be any general purpose control circuit capable of operation as described hereinafter. Vehicle controller 46 is electrically connected to a number, M, of vehicle warning lights 46 via a corresponding number, M, of signal paths 50, wherein M may be any positive integer.

Figure 2A:
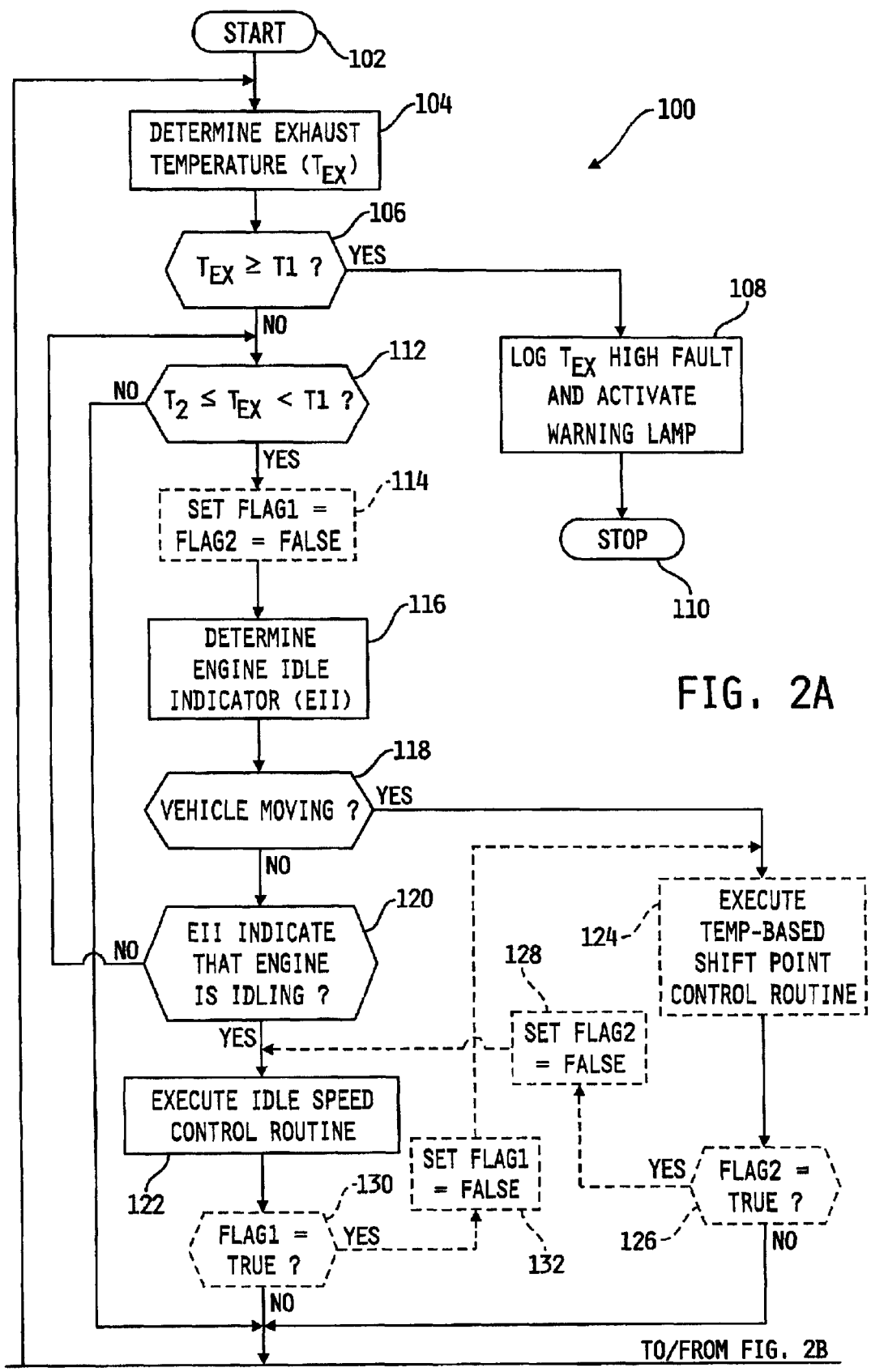
FIGS. 2A and 2B depict a flowchart illustrating one preferred embodiment of a software algorithm for controlling particulate filter temperature, in accordance with the present invention.
Figure 2B:
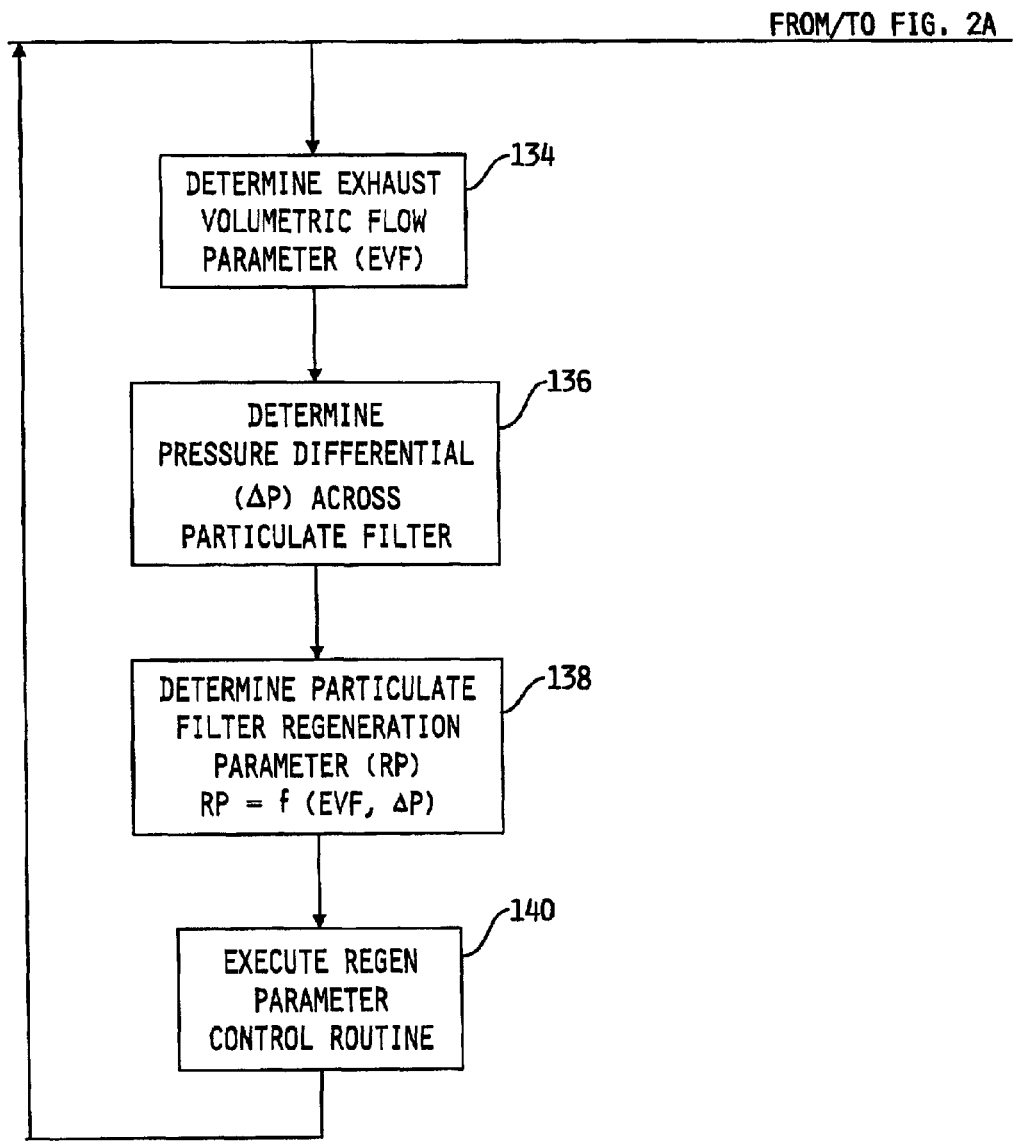

Referring now to FIGS. 2A and 2B, a flowchart is shown illustrating one preferred embodiment of a software algorithm 100 for controlling particulate filter temperature, in accordance with the present invention. In one embodiment, algorithm 100 is stored within memory 19 of hybrid controller 18, and is executed by hybrid controller 18 to control particulate filter temperature in a manner to be described hereinafter. Alternatively, algorithm 100 may be stored within memory 45 of engine controller 42, and executed by controller 42 to control particulate filter temperature. Those skilled in the art will recognize that algorithm 100 may be executed in whole or in part by either of controllers 18 or 42, wherein any information required by the executing controller from the non-executing controller may be obtained via communications datalink 44 in a manner well known in the art. While algorithm 100 may be executed by either controller 18 or controller 42, it will be described for purposes of the description of FIG. 2 as being executed by controller 18. Algorithm 100 begins at step 102, and at step 104 controller 18 is operable to determine an exhaust gas temperature ($T_{EX}$) In one embodiment, controller 18 is operable to execute step 104 by reading the temperature signal produced by temperature sensor 64 of FIG. 1. Alternatively, the present invention contemplates that engine controller 42 may include one or more software algorithms for estimating the temperature of exhaust gas produced by engine 12 as a function of a number of engine operating parameters. In this embodiment, temperature sensor 64 may be omitted (or included to provide redundant temperature information), and the estimated exhaust gas temperature may be used as the temperature $T_{EX}$ in step 104. In any case, execution of algorithm 100 advances from 104 to step 106 where controller 18 is operable to compare the exhaust temperature $T_{EX}$ with a first temperature threshold T1. If, at step 106, controller 18 determines that $T_{EX}$ is greater than or equal to T1, algorithm execution advances to step 108 where controller 18 is operable to log a high exhaust temperature fault within memory 19 and to activate a warning lamp by sending an appropriate message to vehicle controller 46 via signal paths 44. A vehicle controller 46 is, in turn, operable to illuminate an appropriate one or more of the warning lights 48 within view of the operator of the vehicle and/or in view of maintenance personnel servicing the vehicle. Following step 108, algorithm 100 advances to step 110 where the execution of algorithm 100 is stopped. If, on the other hand, control 18 determines at step 106 that $T_{EX}$ is less than the threshold temperature T1, algorithm execution advances to step 112.

It should be apparent from the foregoing that controller 18 is operable to monitor the exhaust temperature $T_{EX}$, and to log an appropriate fault and activate an appropriate warning lamp if the exhaust gas temperature exceeds T1. $T_{EX}$ meeting or exceeding T1 indicates that uncontrolled regeneration of the particulate filter 38 may have occurred and that it is therefore necessary to inspect the particulate filter 38 for damage and/or proper operation. In one embodiment, T1 is set at approximately 600° C., although the present invention contemplates that T1 may be set at other temperature values.

At step 112, controller 18 is operable to compare the exhaust temperature $T_{EX}$ to a temperature range having an upper limit defined by threshold temperature T1 and a lower temperature limit defined by threshold temperature T2. If controller 18 determines at step 112 that $T_{EX}$ is less than T1 and greater than or equal to T2, algorithm execution advances to step 116 where controller 18 is operable to determine an engine idle indicator (EII). It should be pointed out here that steps 114 and 124–130, shown in phantom in FIG. 2A, are included within algorithm 100 as optional steps for an embodiment of system 10 including a transmission having automatically selectable gear ratios as will be described hereinafter with respect to FIG. 12. As algorithm 100 relates to system 10 illustrated in FIG. 1, steps 114 and 124–130 are accordingly omitted and will not be described here.

At step 116, controller 18 is operable in one embodiment to determine EII by monitoring the accelerator pedal sensor 88. If the accelerator pedal sensor 88 produces an accelerator pedal signal indicative of an undepressed accelerator pedal, this is an indication the engine may be idling, and the accelerator pedal signal may therefore be used as the engine idle indicator signal (EII). The accelerator pedal sensor 88, may be for example, an idle validation switch that produces a first logic signal when the accelerator pedal is at least partially depressed, and produces an opposite logic signal when the accelerator pedal is undepressed. As another example, the accelerator sensor pedal 88 may be a potentiometer producing a signal proportional to the amount of deflection of the accelerator pedal. In this embodiment, a sensor output indicating pedal deflection in a range of 0% may be considered to be indicative of an engine idling condition, and the pedal sensor output may accordingly be used as the engine idle indicator EII. As still another example, engine controller 42 may be responsive to the engine speed signal provided by engine speed sensor 52 to make a determination as to whether the engine 12 is idling. In this embodiment, engine speed within a predefined range, or below a threshold engine speed, may be considered indicative of an engine idling condition, and the engine speed sensor output signal may accordingly be used as the engine idle indicator EII. As yet another example, engine controller 42 may monitor the fueling command provided to fuel system 84, and to determine that the engine is in an idling condition if the fueling command is within a predefined fueling command range, or is below a predefined fueling command threshold. Those skilled in the art will recognize that one or more of the foregoing, or other engine operating conditions, from which it may be discernable whether the engine 12 is currently idling may be used at step 116 to determine the engine idle indicator parameter (EII).

Algorithm 100 advances from step 116 to step 118 where controller 18 is operable to determine whether the vehicle carrying engine 12 is currently moving. In one embodiment, controller 18 is operable to make such a determination by monitoring the vehicle speed signal produced by sensor 56 (and provided by engine controller 42 to hybrid controller 18 via signal paths 44), and determine that the vehicle is not moving, or is otherwise stationary, if the vehicle speed signal is below a predefined threshold or is within a predefined vehicle speed range. If controller 18 determines at step 118 that the vehicle is moving, algorithm execution advances to step 134. If, on the other hand, controller 18 determines at step 118 that the vehicle is not moving algorithm 100 advances to step 120 where hybrid controller 18 is operable to determine whether the engine idle indicator (EII) indicates that the engine is idling. If controller 18 determines at step 120 that the engine is not idling, algorithm execution loops from step 120 back to step 112. If, however, controller 18 determines at step 120 that the engine is idling, algorithm execution advances to step 122 where controller 18 executes an idle speed control routine. Algorithm execution advances therefrom to step 134 (FIG. 2B).

Figure 3:
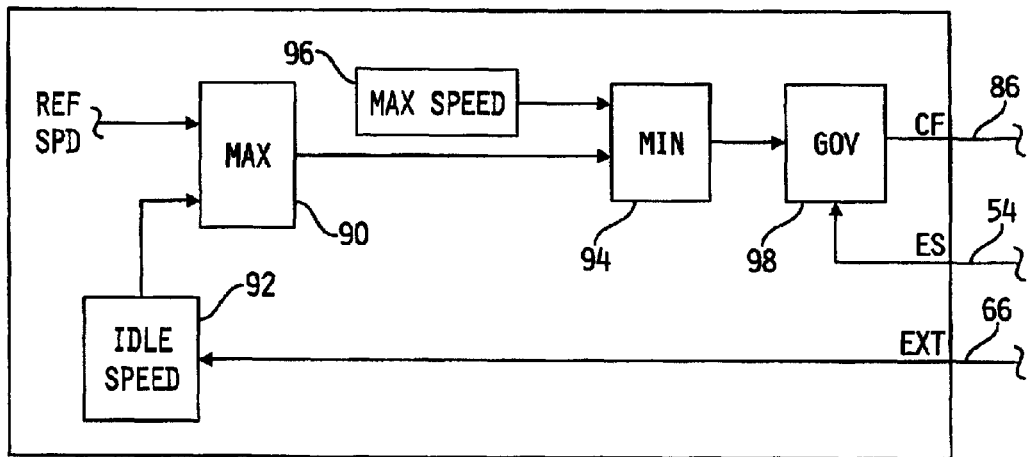
FIG. 3 is a diagrammatic illustration of one preferred embodiment of a portion of the engine controller of FIG. 1 that controls engine idle speed, in accordance with the present invention.

Referring now to FIG. 3, one embodiment of engine controller 42 is shown illustrating some of the functional blocks for executing the idle speed control routine of step 122. Controller 42 includes a MAX block 90 having one input receiving a reference speed value and a second input receiving an idle speed value from idle speed block 92. The reference speed value (REF SPD) is a reference engine speed that is produced by controller 42 as a function of a torque request signal provided by an accelerator pedal (not shown), a cruise control system (not shown), or the like, as is known in the art. MAX block 90 is configured to produce as an output thereof a maximum value of the reference engine speed (REF SPD) and the idle speed produced by block 92, and to supply this value as an input to a MIN block 94 having a second input receiving a maximum speed value from block 96. MIN block 94 is operable to produce as an output thereof the minimum value of the speed value produced by MAX block 90 and the max speed value produced by block 96. This output is provided to one input of an engine speed governor having a second input receiving the engine speed signal on signal path 54. Engine speed governor 98 may be of known construction, and is operable to produce the commanded fueling signal (CF) on signal path 86 in such a manner that reduces the error between the engine speed signal on signal path 54 and the speed value produced by MIN block 94.

The foregoing structure of FIG. 3 describes a conventional engine speed governing system that governs engine speed in an engine speed range between an idle speed value and a maximum speed value provided by blocks 92 and 96 respectively. In accordance with the present invention, the idle speed block 92 further includes an input receiving the exhaust temperature signal on signal path 66, wherein the idle speed block 92 is configured to modify the idle speed as a function of the engine exhaust temperature whenever the engine exhaust temperature is between T2 and T1, the engine is idling and the vehicle is not moving, as will be described in greater detail hereinafter with respect to FIG. 4.

Figure 4:
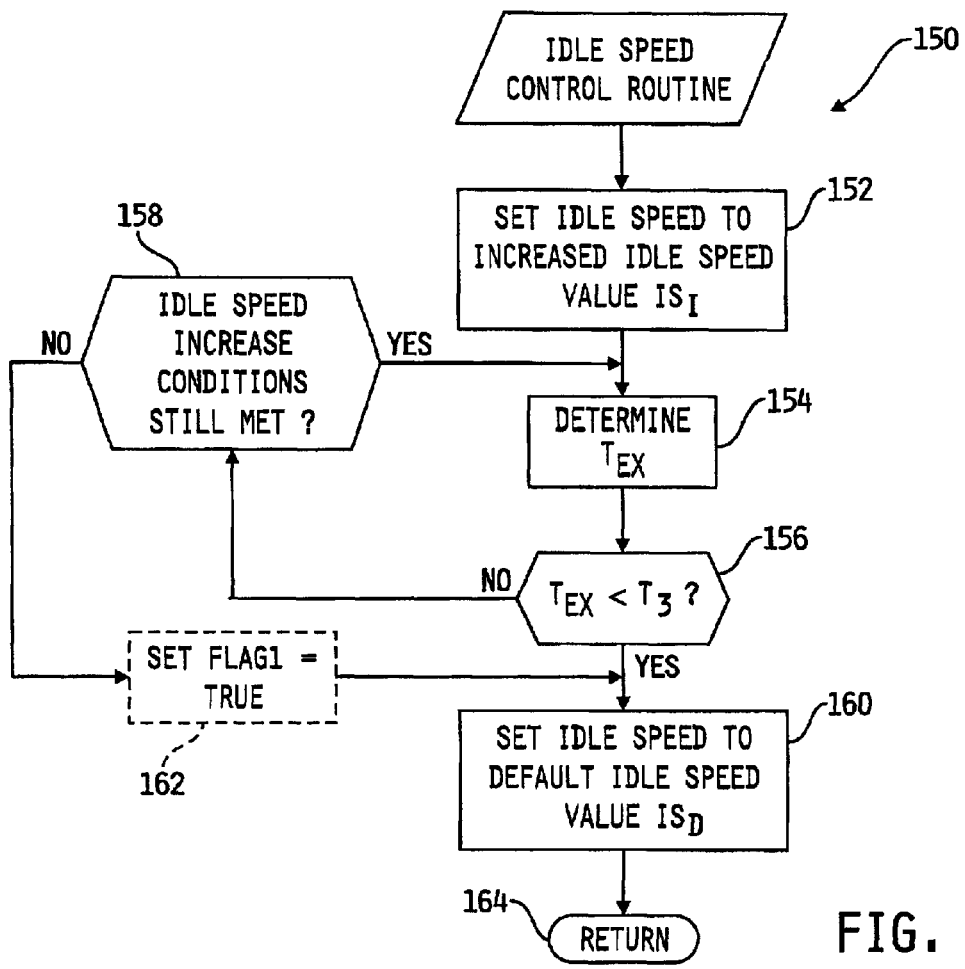
FIG. 4 is a flowchart illustrating one preferred embodiment of a software algorithm for executing the idle speed control routine referenced in the flowchart of FIG. 2A, in accordance with the present invention.

Referring now to FIG. 4, a flowchart is shown illustrating one preferred embodiment of a software algorithm 150 for executing the idle speed control routine of idle speed block 92 that was called at step 122 at algorithm 100. As with algorithm 100, algorithm 150 will be described as being executed by the hybrid controller 18 although algorithm 150 may alternatively be executed by engine controller 42. In any case, algorithm 150 begins at step 152 where controller 18 is operable to increase the idle speed of idle speed block 92 from a default idle speed ($IS_D$) to an increased idle speed value ($IS_I$). Thereafter at step 154, controller 18 is operable to determine the temperature of the exhaust gas $T_{EX}$ using any one or more of the techniques described hereinabove with respect to step 104 of algorithm 100. Thereafter at step 156, controller 18 is operable to compare $T_{EX}$ with a third temperature threshold T3 wherein T3 is less than T2. If, at step 156, controller 18 determines that $T_{EX}$ is less than T3, algorithm execution advances to step 160 where controller 18 is operable to reduce the idle speed value produced by idle speed block 92 from the increased idle speed ($IS_I$) back to the default idle speed ($IS_D$). If, on the other hand, the exhaust gas temperature $T_{EX}$ is greater than or equal to T3, algorithm 150 advances to one step 158 where controller 18 makes a determination as to whether the idle speed increase conditions are still met; namely, whether the vehicle is not moving, as determined by step 118 of algorithm 100, and whether the engine is still idling, as determined by steps 116 and 120 of algorithm 100. If these idle speed increase conditions are still met at step 158, algorithm 150 loops back to step 154. If not, algorithm execution advances to step 160. It should be noted that step 162, shown in phantom in FIG. 4, is included as an optional step for embodiments of system 10 including a transmission having automatically selectable gear ratios, and may therefore be omitted from algorithm 150 as it relates to system 10 illustrated in FIG. 1. In any case, at step 160, algorithm 150 advances from step 160 to step 164 where algorithm execution is returned to step 122 of algorithm 100.

It should now be apparent from the foregoing that algorithm 100 is operable to increase the engine idle speed from its default idle speed value $IS_D$ to an increased idle speed value $IS_I$, if the engine is idling and the vehicle is not moving, whenever the exhaust gas temperature $T_{EX}$ is between temperatures T1 and T2. Exhaust gas temperatures in this range are generally indicative that rapid regeneration of the particulate filter 38 is occurring, and engine idle speed is therefore increased to increase air flow through the particulate filter 38 and thereby reduce the temperature thereof. In one embodiment, T1=600° C., T2=500° C., T3=400° C., $IS_D$=800 rpm, and $IS_I$=1200 rpm, although the present invention contemplates other values for these parameters. In any case, those skilled in the art will recognize in the above description that controller 18 is generally not operable to directly modify the engine idle speed value produced by block 92, but is instead operable to broadcast a message to engine controller 42 requesting such action. In cases where controller 42 is executing algorithms 100 and 150, controller 42 may be operable to directly modify this engine idle speed value.

Referring now to FIG. 2B, algorithm 100 advances from step 122 of FIG. 2A to step 134 as long as the exhaust gas temperature $T_{EX}$ is below T3. At step 134, controller 18 is operable to determine an exhaust volumetric flow parameter (EVF). As described hereinabove with respect to FIG. 1, EVF is a volumetric flow rate parameter and is computed by controller 18 in one embodiment as a function of engine speed, engine load and exhaust gas temperature in units of actual cubic feet per minute (ACFM) or other suitable flow units. Alternatively, if system 10 includes a mass flow sensor 72 as described with respect to FIG. 1, controller 18 may be operable to execute step 134 as a known function of the mass flow rate of exhaust gas produced by engine 12 from the signal produced by mass flow sensor 72. In either case, algorithm 100 advances from step 134 to step 136 where controller 18 is operable to determine a pressure differential, ΔP, across the particulate filter 38 in units of in. Hg or other suitable pressure units. In one embodiment, controller 18 is operable to compute ΔP as a difference between the exhaust gas pressure signal provided by pressure sensor 60 and the ambient pressure signal produced by ambient pressure sensor 68. In cases where system 10 includes a differential pressure sensor 76 as illustrated in phantom in FIG. 1, controller 18 may alternatively be operable at step 136 to determine the pressure differential ΔP across the particulate filter 38 directly by reading the output of sensor 76. In any case, algorithm 100 advances from step 136 to step 138 where controller 18 is operable to determine a particulate filter regeneration parameter, RP, as a function of EVF and ΔP. Thereafter at step 140, controller 18 is operable to execute a regeneration parameter control routine, and to loop therefrom back to step 104 for re-execution of algorithm 100.

Figure 6:
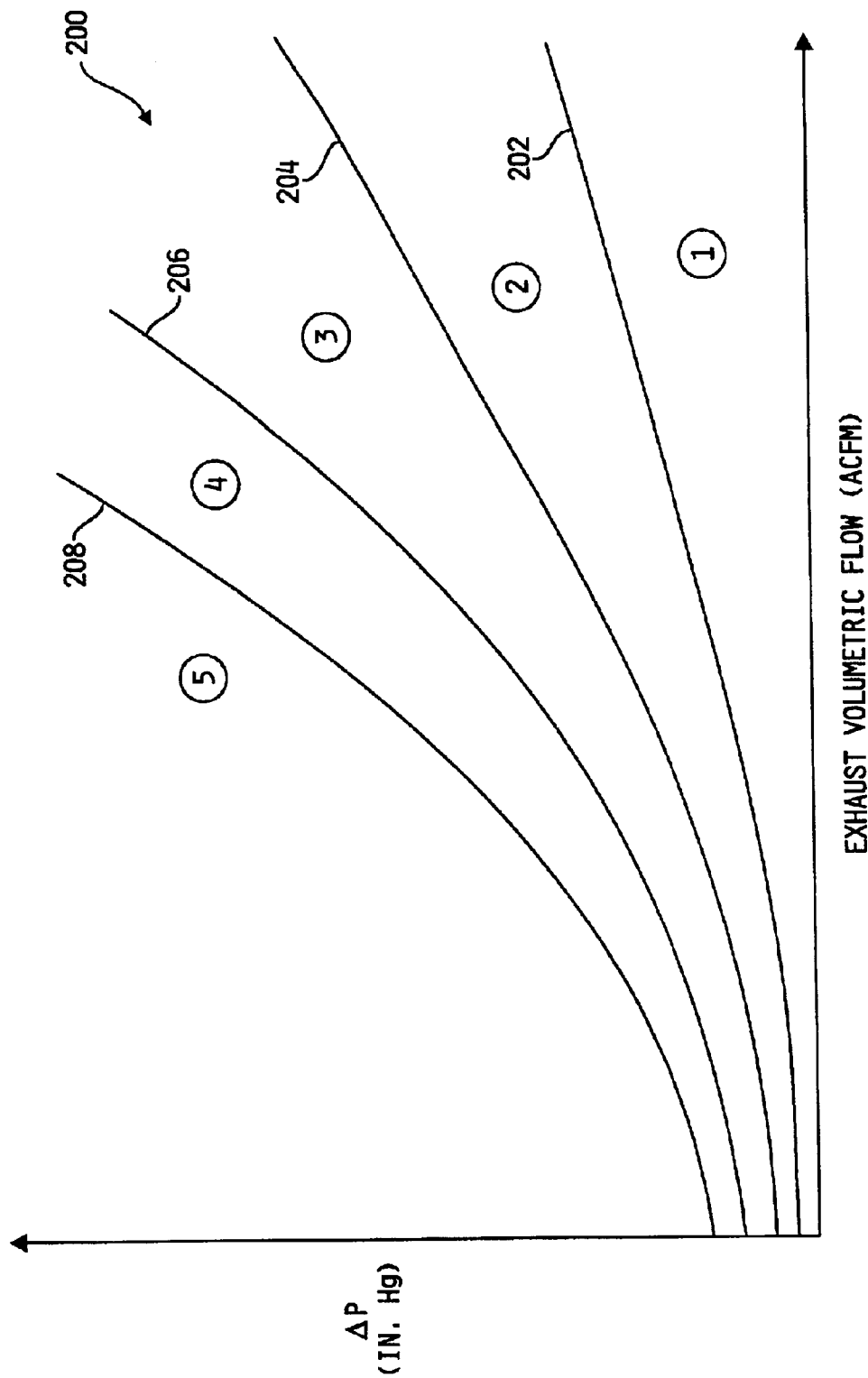
FIG. 6 is a plot of pressure differential across the particulate filter vs. exhaust volumetric flow defining various operating zones of a filter regeneration parameter defined thereby, in accordance with the present invention.

Referring now to FIG. 6, a plot 200 of ΔP vs. exhaust volumetric flow (EVF) is shown illustrating one preferred embodiment of step 136 of algorithm 100. In this embodiment, regeneration parameter boundaries 202, 204, 206 and 208 are defined within memory 19, and the regeneration parameter, RP, computed at step 136 therefore falls within one of the zones 1–5 defined by these boundaries 202, 204, 206 and 208. In one embodiment, memory 19 includes therein a map of ΔP versus EVF having boundaries 202, 204, 206 and 208 superimposed thereon, wherein the regeneration parameter, RP, is in any case a measure of the back pressure resulting from the air flow through the particulate filter 38. Thus, for example, low back pressure, as a function of EVF, occur in the lower-numbered zones, and high back pressure, as a function of EVF, correspond to the higher-numbered zones in FIG. 6.

Figure 5:
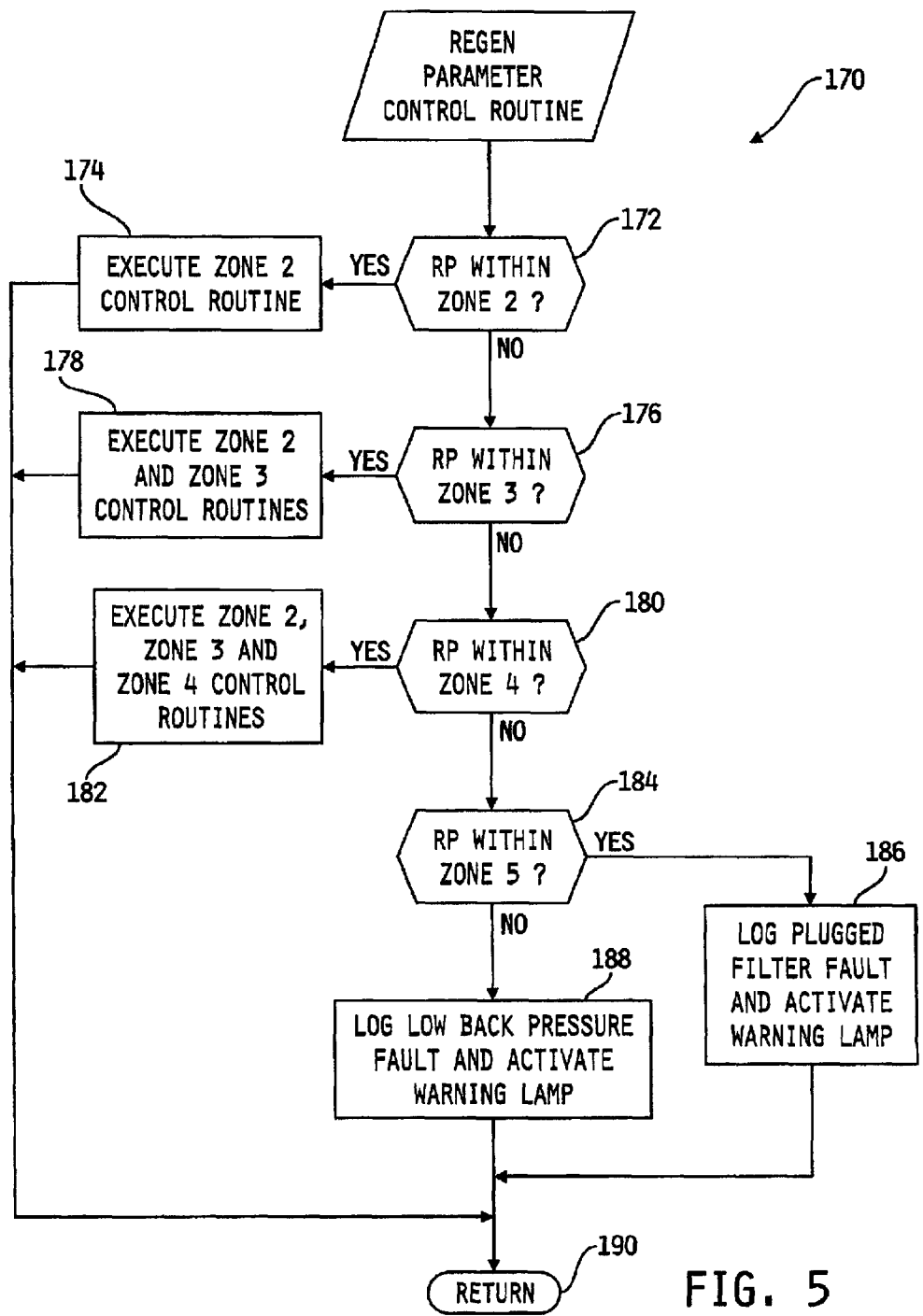
FIG. 5 is a flowchart illustrating one preferred embodiment of a software algorithm for executing the filter regeneration parameter control routine referenced in the flowchart of FIG. 2B, in accordance with the present invention.

Referring now to FIG. 5, a flowchart is shown illustrating one preferred embodiment of an algorithm 170 for executing the regeneration parameter control routine called at step 140 of algorithm 100 within the framework illustrated by the plot of FIG. 6. As with algorithm 100 and 150, algorithm 170 will be described as being executed by controller 18, although the present invention contemplates that algorithm 170 may alternatively be executed by engine controller 42. In any case, algorithm 170 begins at step 172 where controller 18 is operable to determine whether the regeneration parameter, RP, computed at step 136 is within zone 2 as illustrated in plot 200 of FIG. 6. If so, algorithm 170 advances to step 174 where controller 18 is operable to execute a zone 2 control routine, one embodiment of which will be described hereinafter in detail with respect to FIGS. 7 and 8. If, on the other hand, controller 18 determines at step 172 that the regeneration parameter, RP, is not within zone 2, algorithm execution advances to step 176 where controller 18 determines whether RP is within zone 3. If so, algorithm execution advances to step 178 where controller 18 is operable to execute the zone 2 control routine, and to execute a zone 3 control routine, one embodiment of which will be described in detail hereinafter with respect to FIGS. 9–10B. If, at step 176, controller 18 determines that RP is not within zone 3, algorithm execution advances to step 180 where controller 18 determines whether RP is within zone 4. If so, algorithm execution advances to step 182 where controller 18 is operable to execute the zone 2 and zone 3 control routines, and to execute a zone 4 control routine, one embodiment will be described hereinafter with respect to FIG. 11. If, on the other hand, controller 18 determines at step 180 that RP is not within zone 4, algorithm execution advances to step 184 where controller 18 is operable to determine whether RP is within zone 5. If so, this is indicative of undesirably high back pressure and algorithm execution advances to step 186 where controller 18 is operable to activate a warning lamp by instructing the vehicle controller 46 to illuminate an appropriate one or more of the warning lights 48 and/or log a plugged filter fault within memory 19. Additionally, if operation remains in or progresses further into zone 5, an engine power limiting strategy may optionally be executed as a function of RP to prevent engine damage and/or improper operation resulting from excessive back pressure. If, on the other hand, controller 18 determines that RP is not within zone 5 at step 184, then RP must be within zone 1 which is indicative of an undesirably low back pressure value. In this case, algorithm execution advances to step 188 where controller 18 is operable to instruct the vehicle controller 46 to activate an appropriate one or more of the warning lamps 48, and/or to log a low back pressure fault within memory 19, to thereby indicate that the particulate filter 38 is broken or has failed. Algorithm 170 advances from steps 174, 178, 182, 186 and 188 to step 190 where algorithm execution is returned back to step 140 of algorithm 100.

Figure 7:
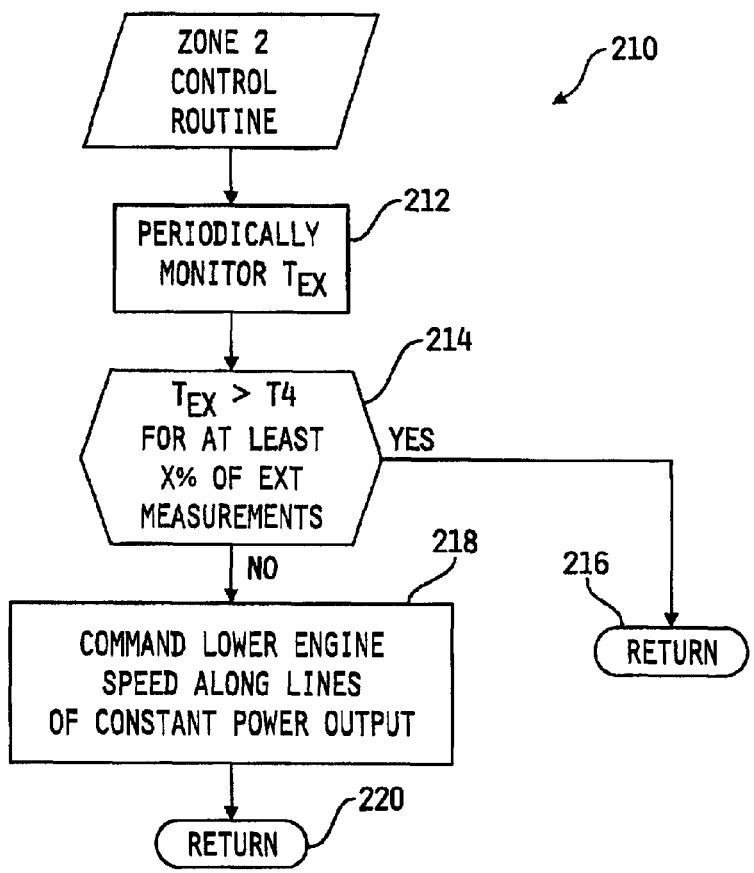
FIG. 7 is a flowchart illustrating one preferred embodiment of a software algorithm for executing the zone 2 control routine referenced in the flowchart of FIG. 5, in accordance with the present invention.
Figure 8:
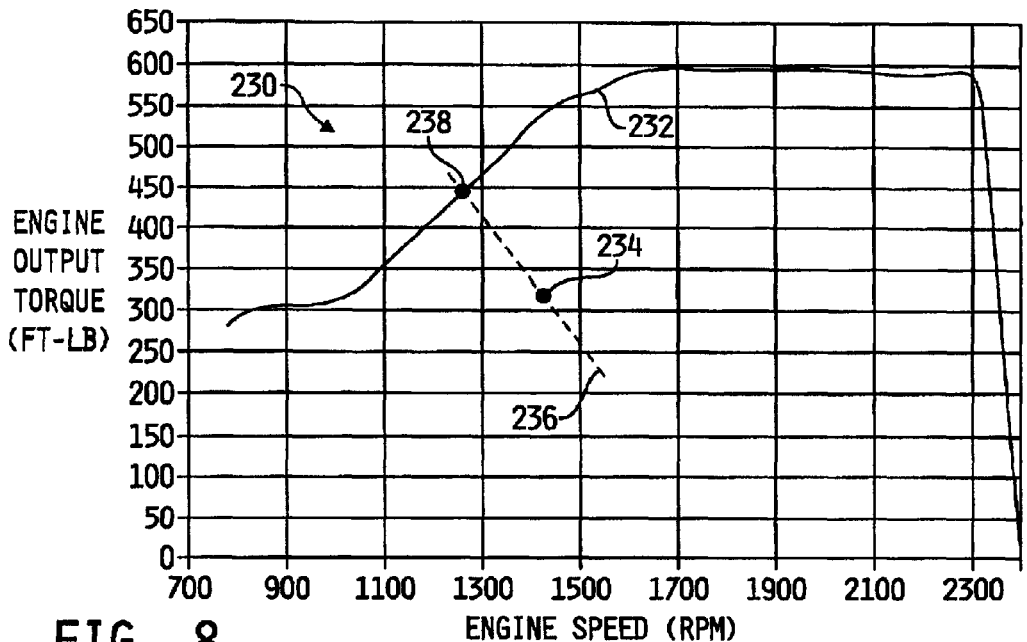
FIG. 8 is a plot of engine output torque vs. engine speed illustrating at least a portion of the zone 2 control strategy of FIG. 7.

Referring now to FIG. 7, a flowchart is shown illustrating one preferred embodiment of a software algorithm 210 for executing the zone 2 control routine referenced at step 174 of algorithm 170, in accordance with the present invention. Routine 210 begins at step 212 where controller 18 is operable to periodically monitor the exhaust gas temperature, $T_{EX}$, in accordance with any one or more of the techniques described hereinabove. Thereafter at step 214, controller 18 is operable to compare $T_{EX}$ to a fourth temperature threshold $T_4$, wherein T4 is less than $T_3$ (step 156 of algorithm 150). If controller 18 determines that $T_{EX}$ is greater than $T_4$ for at least a predefined percentage of exhaust gas temperature measurements, algorithm execution advances to step 216 where algorithm 210 is to its calling routine. If, on the other hand, controller 18 determines the $T_{EX}$ is not greater than $T_4$ for at least the predefined percentage of exhaust gas temperature measurements, algorithm execution advances to step 218 where controller 18 is operable to command lower engine speeds along lines of constant power output of engine 12. Referring to FIG. 8, a plot 230 of engine output torque vs. engine speed is shown illustrating one embodiment of step 218. Plot 230 illustrates a typical torque curve 232 representative of maximum output torque of engine 12 over a range of engine speeds. Dashed line 236 represents a line of constant power output of engine 12 passing through an arbitrary engine operating point 234, wherein operating point 234 is a function of engine speed and engine load. In accordance with algorithm 210, step 218 is operable to move the engine operating point 234 along dashed line 236 toward engine operating point 238 that defines the intersection of dashed line 236 with the torque curve 232. It is to be understood that engine operating point 234 is illustrative of an arbitrary engine operating point, and that step 218 generally operable to move the current engine operating point, wherever on plot 230 it may be at any given time, along a corresponding line of constant engine output power toward a lower engine speed/higher engine load operating point which may or may not lie on torque curve 232. Step 218 of algorithm 210 advances to step 220 where algorithm 210 is returned to its calling routine.

From the foregoing it should now be apparent that the zone 2 control algorithm 210 is generally operable to move the current engine operating point (i.e., engine speed/load point) toward a lower engine speed/higher engine load operating point along a line of constant engine output power whenever the exhaust gas temperature, $T_{EX}$, is not greater than a temperature threshold $T_4$, for at least some predefined percentage of exhaust gas temperature measurements. It is generally understood that for proper regeneration of the particulate filter 38, the exhaust gas temperature $T_{EX}$, must be above a temperature threshold, $T_4$, for at least 10% of the engine operating time. In the embodiment of algorithm 210 described herein, the exhaust gas temperature, $T_{EX}$, is periodically monitored in a continual manner such that the foregoing requirement may be implemented at step 214 by determining whether $T_{EX}$ is greater than $T_4$ for at least X % of the exhaust gas temperature measurements. In one embodiment, X=10%, and $T_4$ equals 330° C., and step 214 therefore requires that $T_{EX}$ be greater than 330° C. for at least 10% of the exhaust gas temperature measurements. If this does not occur, lower engine speeds (and higher engine loads) along lines of constant power output are commanded in a manner described hereinabove with respect to FIG. 8. By decreasing engine speeds along lines of constant engine output power, engine loads are correspondingly increased. Increasing the engine load generally increases exhaust gas temperatures produced by engine 12, thereby promoting proper regeneration of particulate filter 38. If, on the other hand, $T_{EX}$ is greater than 330° C. for at least 10% of the exhaust gas temperature measurements, this is deemed adequate for proper regeneration of particulate filter 38, and no further action need be taken. It should be understood that $T_4=330°$ C. and X=10% are provided only by a way of example, and that the present invention contemplates other valuables for these variables.

Figure 9:
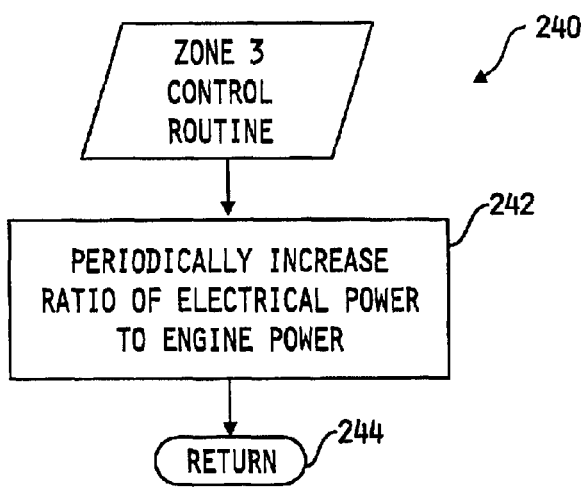
FIG. 9 is a flowchart illustrating one preferred embodiment of a software algorithm for executing the zone 3 control routine referenced in the flowchart of FIG. 5, in accordance with the present invention.
Figure 10A:
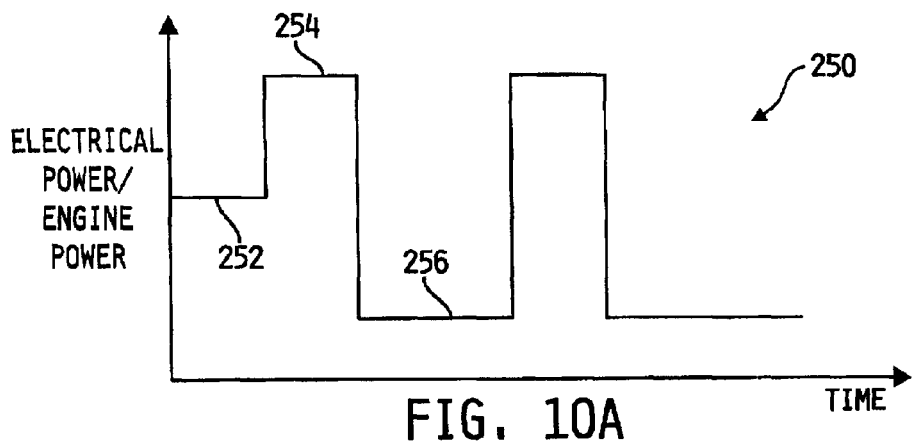
FIG. 10A is a plot of electrical power-engine power ratio vs. time illustrating at least a portion of the zone 3 control strategy of FIG. 9.
Figure 10B:
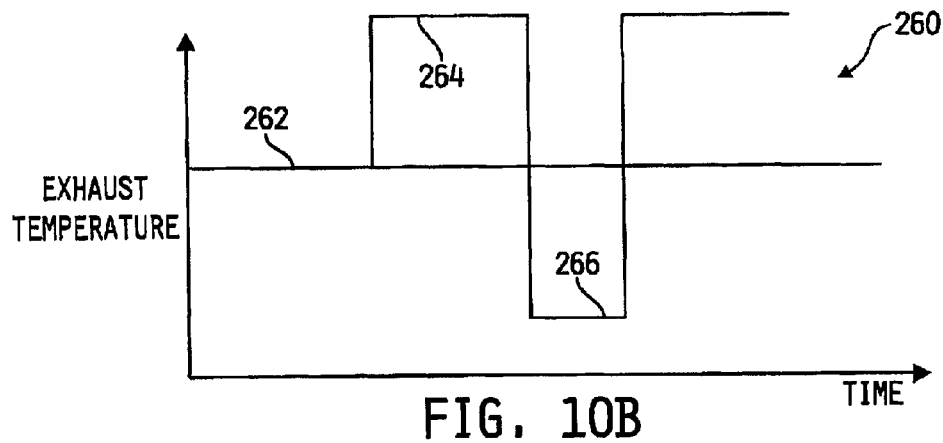
FIG. 10B is a plot of exhaust temperature vs. time illustrating at least a portion of the zone 3 control strategy of FIG. 9.

Referring now to FIG. 9, a flowchart is shown illustrating one preferred embodiment of a software algorithm 240 for executing the zone 3 control routine referenced at step 178 of algorithm 170 (FIG. 5). Algorithm 240 begins at step 242 where controller 18 is operable to periodically increase the ratio of electrical power supplied by battery 30 to engine power supplied by engine 12. When the regeneration parameter, RP, is within zone 3 (see FIG. 6), this indicates relatively higher back pressure within the exhaust system, which is indicative of a higher particulate matter content within the particulate filter 38 as compared with zone 2 operation. In accordance with the present invention, it is desirable to execute not only the zone 2 control routine illustrated in FIG. 7, but to additionally execute the zone 3 control routine illustrated in FIG. 9 in order to increase the exhaust gas temperature sufficiently to cause proper regeneration of the particulate filter 38. Step 242 of algorithm 240 accomplishes the zone 3 control strategy in a manner that will be described with respect to FIGS. 10A and 10B. Referring first to FIG. 10A, a plot 250 of the ratio of electrical power supplied by battery 30 and engine power supplied by engine 12 is shown. Ratio level 252 represents a default ratio of electrical power to engine power that typically exists under normal operating conditions. In accordance with the present invention, step 242 of algorithm 240 periodically increases this ratio to a level 254 and then decreases the ratio to a level 256 as shown in FIG. 10A. The effect on exhaust gas temperature, $T_{EX}$, of the periodic increase and decrease of the ratio of electrical power to engine power illustrated in FIG. 10A is shown in FIG. 10B. Referring to FIG. 10B a plot 260 of exhaust gas temperature, $T_{EX}$, is shown where an example baseline exhaust gas temperature 262 is shown to illustrate what the exhaust gas temperature would be in the absence of the zone 3 control routine 240. As illustrated in FIG. 10B, the effect of increasing the ratio of electrical power to engine power to level 254 in FIG. 10A results in a more rapid depletion of the charge on battery 30. When this occurs, controller 18 is operable, pursuant to conventional hybrid engine-electric vehicle control strategies, to command increased engine output torque to thereby increase the rate at which battery 30 is recharged. Increasing the output torque/power of engine 12 results in an increase in the temperature in the exhaust gas as illustrated by the elevated exhaust gas temperature level 264 in FIG. 10B, thereby promoting proper regeneration of the particulate filter 38. Similarly, decreasing the electrical power to engine power ration to the ratio value 256 illustrated in FIG. 10A results in a subsequent decrease in the exhaust gas temperature to a temperature level 256 as illustrated in FIG. 10B. In one embodiment, the magnitudes and the durations of the electric power to engine power ratio increases and decreases 254 and 256 respectively are chosen such that the resulting increases and decreases 264 and 266 respectively of the exhaust gas temperature cancel each other so that the average exhaust gas temperature over time remains at the baseline level 262. While the average exhaust gas temperature remains relatively constant over time, the periodic increases in the exhaust gas temperature promote more frequent, and more proper, regeneration of the particulate filter 38 than would maintaining the exhaust gas temperature at the baseline value 262. It should be understood, however, that such magnitudes and durations of the temporary increases and decreases in the electrical power/engine power ratio and the exhaust gas temperature illustrated in FIGS. 10A and 10B are not strictly required, and the present invention contemplates other increase, decrease and duration values for both the electrical power/engine power ratio and exhaust gas temperature. Returning again to FIG. 9, algorithm execution advances from 242 to step 244 where algorithm 240 is returned to its calling routine.

Figure 11:
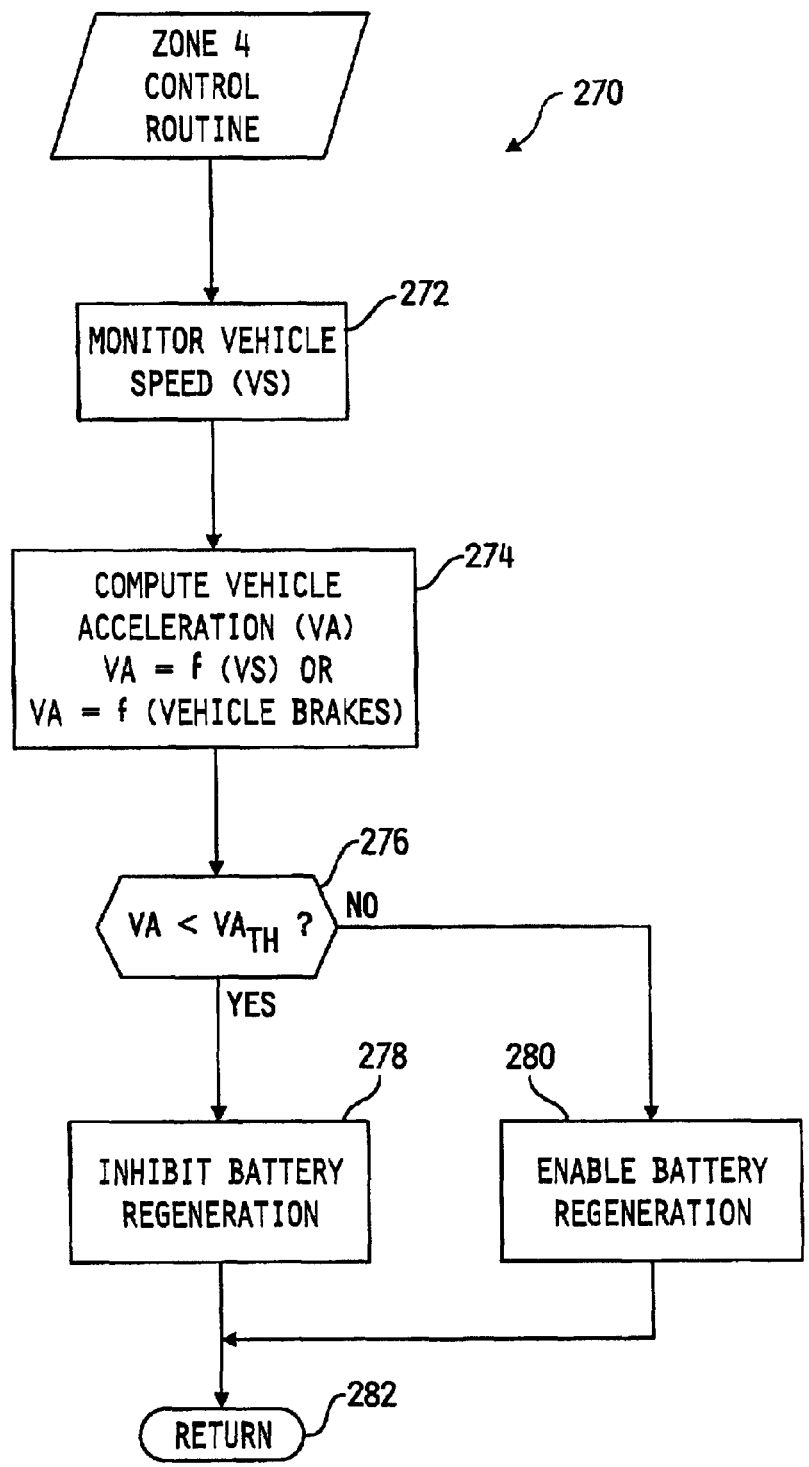
FIG. 11 is a flowchart illustrating one preferred embodiment of a software algorithm for executing the zone 4 control routine referenced in the flowchart of FIG. 5.

Referring now to FIG. 11, a flowchart is shown illustrating one preferred embodiment of a software algorithm 270 for executing the zone 4 control routine referenced at step 182 of algorithm 170 (see FIG. 5). Values of the regeneration parameter, RP, within zone 4 indicate higher back pressures as compared with zone 2 and zone 3 operation, and consequently higher particulate content within the particulate filter 38. In accordance with the present invention, the zone 4 control routine 270 is accordingly executed, along with the zone 2 and zone 3 control algorithms discussed hereinabove, whenever RP is within zone 4 to thereby increase the exhaust gas temperature sufficiently to promote proper regeneration of the particulate filer 38. Algorithm 270 begins at step 272 where controller 18 is operable to monitor the vehicle speed (VS), such as by monitoring the signal produced by the vehicle speed sensor 56 illustrated in FIG. 1. Thereafter at step 274, controller 18 is operable to compute a vehicle acceleration value (VA) as a well-known function of vehicle speed, VS. Alternatively, controller 18 may be operable at step 274 to compute the vehicle acceleration value (VA) as a known function of brake pressure, brake travel or percent brake deflection provided by brake sensor 92 as described hereinabove. Thereafter at step 276, controller 18 is operable to compare the vehicle acceleration value VA with a vehicle acceleration threshold, $VA_{TH}$. If VA is less than $VA_{TH}$ at step 276, indicating that vehicle deceleration is greater than a corresponding vehicle deceleration threshold, algorithm execution advances to step 278 where controller 18 is operable to inhibit battery regeneration or recharging. If, on the other hand, VA is greater than or equal to $VA_{TH}$ at step 276, indicating that vehicle deceleration is less than or equal to the corresponding vehicle deceleration threshold, algorithm execution advances to step 280 where controller 18 is operable to enable battery regeneration or recharging. Steps 278 and 280 each advance to step 282 where algorithm 270 is returned to its calling routine.

Pursuant to conventional operation of controller 18 in the hybrid engine-electric vehicle application as described hereinabove, controller 18 is operable under braking and other vehicle motoring conditions to supply electrical energy produced by motor/generator 20 under such conditions to battery 30 to regenerate or recharge battery 30. Algorithm 270 is configured such that controller 18 is operable to determine whether the vehicle is currently undergoing a braking or other vehicle motoring condition by monitoring vehicle acceleration. The vehicle acceleration threshold, $VA_{TH}$ is set at a value below which vehicle acceleration (conversely, the vehicle deceleration threshold is set at a value above which vehicle deceleration) is indicative of conditions under which motor/generator 20 would typically be operating in a generator mode so as to regenerate or recharge battery 30. In accordance with the zone 4 control algorithm 270, if the regeneration parameter, RP, is within zone 4 (see FIG. 6) controller 18 inhibits battery regeneration upon detection that the motor/generator 20 is operating in the generator mode so as to recharge battery 30 as just described. By inhibiting battery regeneration under these conditions, the charge on battery 30 will be depleted at a faster rate than would be the case in the absence of algorithm 270 so that controller 18 more frequently commands higher engine output torque/power to regenerate battery 30 via generator 16. This has the net effect of increasing the temperature of the exhaust gas produced by engine 12, thereby promoting proper regeneration of the particulate filter 38 as described hereinabove.

It is to be understood that the regeneration parameter zone control strategies just described with respect to FIGS. 5–11 represent only one illustrative implementation of a general regeneration parameter-based control strategy for controlling engine exhaust gas temperature, and that the present invention contemplates other regeneration parameter-based strategies. For example, plot 200 may alternatively be subdivided into more or less zones than are illustrated in FIG. 6, and control strategies implemented to address each such zone. Any such alternative regeneration parameter-based control strategies for controlling engine exhaust gas temperature to thereby control the temperature of the particulate filter 38 are intended to fall within the scope of the present invention.

Figure 12:
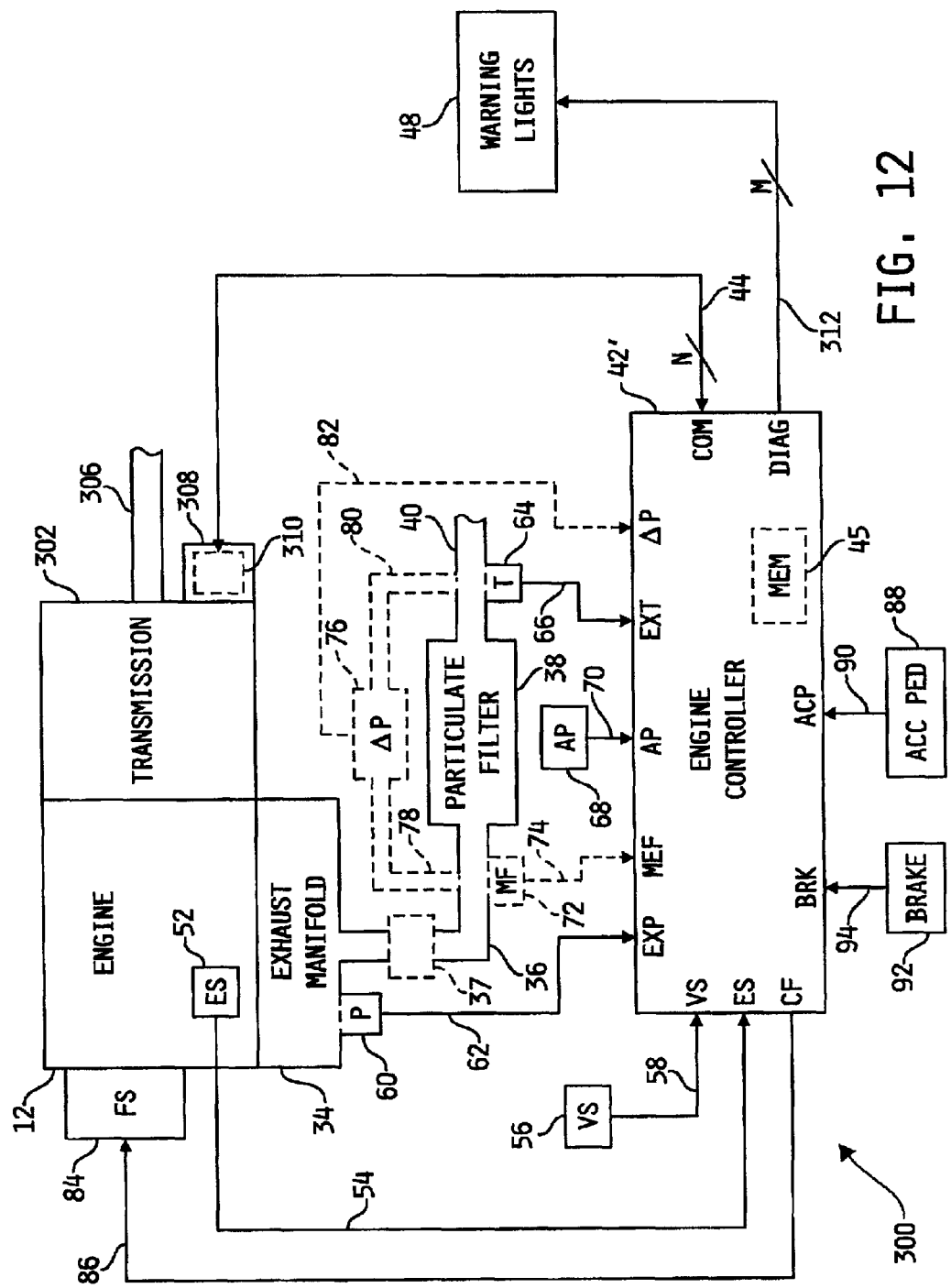
FIG. 12 is a diagrammatic illustration of one preferred embodiment of a system for controlling particulate filter temperature in a vehicle application having an engine interfacing with a transmission coupled to the vehicle wheels, in accordance with the present invention.

Referring now to FIG. 12, one preferred embodiment of a system 300 for controlling particulate filter temperature in a vehicle application having an engine coupled directly to a transmission, in accordance with the present invention, is shown. System 300 includes many components in common with system 10 illustrated in FIG. 1, and like numbers are accordingly used to identify like elements. Unlike system 10, system 300 does not include generator 16, motor/generator 20, battery 30, hybrid controller 18 or vehicle controller 46. Instead, engine 12 is mechanically coupled to a transmission 302 having a tail shaft 306 extending therefrom and operable to drive the vehicle wheels (not shown). In one embodiment, transmission 302 is an automated manual, fully automatic or other transmission having a number of automatically selectable gear ratios, such that selection of any such gear ratio is electronically controlled by a transmission controller 310 housed within a transmission control module 308 or by engine controller 42'. Alternatively, transmission 302 may be a CVT defining a torque reduction ratio that is electronically controlled by transmission controller 310 or engine controller 42'. In any case, the communication port COM of engine controller 42' in this embodiment is electrically connected to the transmission controller 310 via communications path 44 such that information may be shared between engine controller 42' and transmission controller 310 in a manner described hereinabove with respect to FIG. 1. In an alternative embodiment, transmission 302 may include one or more manually selectable gear ratios, wherein selection of any one or more of the manually selectable gear ratios is controlled by an operator of the vehicle in a manner well-known in the art. In system 300, engine controller 42' also includes a diagnostic output DIAG, electrically connected to the warning lights 48 via a number, M, of signal paths 312 wherein M may be any positive integer. Engine controller 42' in this embodiment, is operable to control activation and deactivation of any one or more of the warning lights 48 via the diagnostic output DIAG.

In the embodiment of system 300 illustrated in FIG. 12, algorithm 100 of FIGS. 2A and 2B may be executed by either engine controller 42' or transmission controller 310 wherein any electronic information may be shared between controllers 42' and 310 via communication paths 44.

Referring back to 2A and 2B, algorithm 100 for controlling the temperature of the particulate filter 38 in system 300 of FIG. 12 includes all of the solid-line steps described hereinabove with respect to FIG. 1, as well as the dashed-line steps that were indicated as applicable only to systems having engine 12 coupled directly to a transmission such as system 300 of FIG. 12. For purposes of the following description, some of the steps of algorithm 100 that were described above with respect to system 10 of FIG. 1 will therefore not be repeated here in detail, and instead algorithm 100 will only be described in sufficient detail to describe the operation of algorithm 100 as it relates to system 300 of FIG. 12. In this regard, controller 42' is operable to execute steps 102–112 identically as described hereinabove with respect to system 10 of FIG. 1. If, at step 112, controller 42' determines that the exhaust gas temperature, $T_{EX}$, is less than T1 and greater than or equal to T2, algorithm execution advances to step 114 where controller 42' is operable to set flags FLAG1 and FLAG2 within memory 45 each to a false value. Thereafter, controller 42' is operable to execute steps 116, 118 and 120 in a manner identically to that described hereinabove with respect to system 10 of FIG. 1. However, if, at step 118, controller 42' determines that the vehicle is moving, algorithm execution advances to step 124 where 42' is operable to execute a temperature-based shift point control routine.

Figure 13:
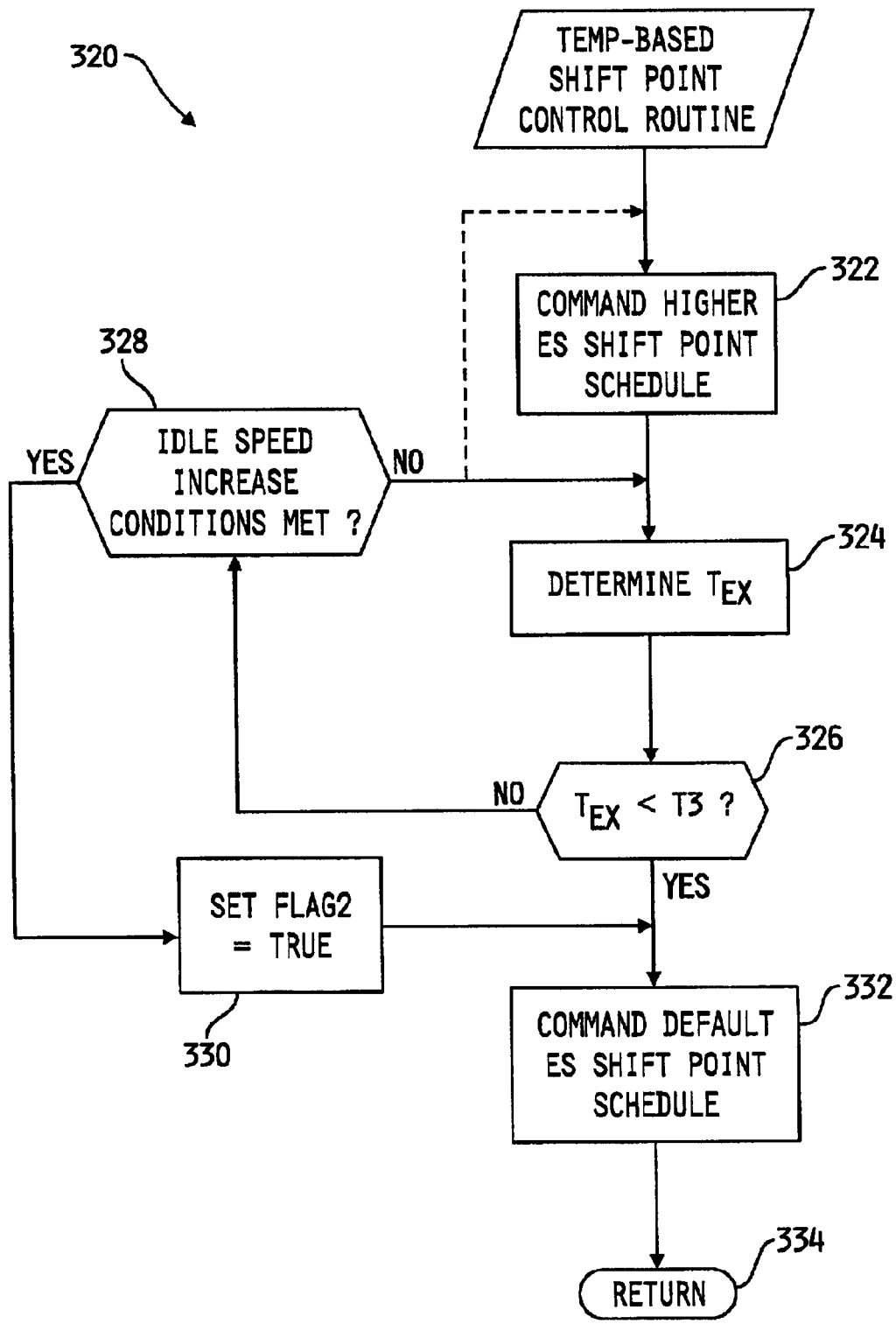
FIG. 13 is a flowchart illustrating one preferred embodiment of the temperature-based shift point control routine referenced in the flowchart of FIG. 2A, in accordance with the present invention.

Referring now to FIG. 13, a flowchart is shown illustrating one preferred embodiment of the temperature-based shift point control routine 320 referenced at step 124 of algorithm 100, in accordance with the present invention. Algorithm 320 begins at step 322 where controller 42' is operable to command a higher engine speed shift point schedule. Generally, transmission controller 310 includes one or more software algorithms operable to control shifting between the automatically selected gear ratios of transmission 302. In this regard, such shift control routines are resident within transmission controller 310, and are operable to select engine speed points at which shifting between the automatically selected gear ratios of transmission 302 as is well-known in the art. In the absence of algorithm 320, at least for purposes of the present invention, transmission controller 310 is operable in embodiments of transmission 308 having a number of automatically selected gear ratios to electronically control shifting therebetween according to a default engine speed shift point schedule. In this embodiment, the transmission controller 310 is responsive to a command by engine control 42' for a higher engine speed shift point schedule to either implement a new shift point schedule having the shift points of the automatically selectable gear ratios set at higher engine speeds than would normally occur with the default shift point schedule, or to alter the default engine speed shift point schedule to increase the engine speed points at which the shifts occur. Algorithm 320 is thus applicable only in embodiments wherein transmission 308 includes a number of automatically selectable gear ratios.

Following step 322, algorithm execution advances to step 324 where controller 42' is operable to again determine the exhaust gas temperature, $T_{EX}$, according to any one or more of the techniques described hereinabove with respect to system 10 of FIG. 1. Thereafter at step 326, controller 42' is operable to compare the exhaust gas temperature, $T_{EX}$, with the temperature threshold T3, wherein T3 may be identical to T3 described with respect to algorithm 150 of FIG. 4. If, at step 326, controller 42' determines that $T_{EX}$ is greater than or equal to T3, algorithm 320 advances to step 328 where controller 42' is operable to determine whether the idle speed increase conditions (steps 116–120 of algorithm 100) are met. If not, algorithm execution loops back, in one embodiment, to step 324. Alternatively, step 328 may advance from its "no" branch back to step 322. Thus, in one embodiment of algorithm 320, unless and until the exhaust gas temperature $T_{EX}$ drops below the temperature threshold T3 and the idle speed increase conditions are not met, algorithm 320 simply loops back to step 324 to continue monitoring the exhaust gas temperature $T_{EX}$ Alternatively, controller 42' may be configured to progressively increase the engine speed shift points of the shift point schedule contained in the transmission controller 310 as a function of the exhaust gas temperature $T_{EX}$. In one embodiment, for example, controller 42' may be configured to control the increase in engine speed shift points as a function of a difference between $T_{EX}$ and T3. As another example, controller 42' may be configured to incrementally increase the engine speed shift points as a function of the time or number of algorithm executions for which $T_{EX}$ is above T3. Those skilled in the art will recognize other techniques for modulating the increase in engine speed shift points of the transmission shift point schedule as a function of $T_{EX}$ and T3, and any other such techniques are intended to fall within the scope of the present invention.

In any case, if controller 42' determines at step 328 that the idle speed increase conditions (steps 116–120 of algorithm 100) are met, algorithm execution advances to step 330 where controller 42' is operable to set the flag FLAG2 to true. From step 330 or the "yes" branch of step 326, algorithm execution advances to step 332 where controller 42' is operable to command the default engine speed shift point schedule described hereinabove. Thereafter at step 334, execution of algorithm 320 returns to its calling routine.

It should be apparent from the foregoing that algorithm 320 is included to increase engine speed shift points in the automatic gear shifting routines executed by transmission controller 310 whenever the exhaust temperature $T_{EX}$ is greater than T2 but less than T1 and the idle speed increase conditions of steps 116–120 are not met. By increasing the engine speed shift points under these conditions, higher engine speed/lower engine load operation of engine 12 results, thereby increasing exhaust flow to particulate filter 38 and reducing its operating temperature below the threshold temperature T3. Algorithm 320 is accordingly applicable only in embodiments of system 300 including a transmission 302 with a number of automatically selectable gear ratios.

Returning back to FIG. 2A, algorithm execution advances from step 124 to step 126 where controller 42' is operable to test the status of the flag FLAG2. If, at step 126, FLAG2 is true, this indicates that during the temperature-based shift point control routine 320 of FIG. 13, the idle speed increase conditions of steps 116–120 were met and algorithm execution accordingly advances to step 128 where controller 42' is operable to set the flag FLAG2 to false and advance therefrom to step 122 to execute the idle speed control routine. If, on the other hand, controller 42' determines that step 126 that the flag FLAG2 is false, then the temperature-based shift point control routine 320 of FIG. 13 successfully reduced the exhaust gas temperature, $T_{EX}$, to below the temperature threshold T3, and execution of algorithm 100 thus advances from step 126 to step 134 (FIG. 2B).

Referring once again to FIG. 4, algorithm 150 includes optional step 162, as shown in phantom, that is included in algorithm 150 in embodiments of system 300 in which transmission 308 includes a number of automatically selectable gear ratios. In this embodiment, the "no" branch of step 158 advances to step 162 where controller 42' is operable to set the flag FLAG1 to a true state prior to advancing to step 160. Referring back now to FIG. 2A, execution of algorithm 100 advances from 122 to step 130 where controller 42' is operable to determine the status of FLAG1. If, at step 130, controller 42' determines that FLAG1 is true, this indicates that controller 42' has determined at step 158 of algorithm 150 that the idle speed increase conditions of steps 116–120 were no longer met, and execution of algorithm 100 accordingly advances from the "yes" branch of step 130 to step 132 where controller 42' is operable to set the flag FLAG1 to a false state and then advance therefrom to step 124 to execute the temperature-based shift point control routine. Steps 112–130 accordingly implement a control routine for reducing the exhaust gas temperature, $T_{EX}$, to below the threshold temperature T3 by either executing the idle speed control routine 150 of FIG. 4 when the idle speed increase conditions of steps 116–120 are met, and by executing the temperature-based shift point control routine 320 of FIG. 13 when the idle speed increase conditions of steps 116–120 are not met. Those skilled in the art will recognize that in embodiments of system 300 including a transmission 308 that includes only manually selectable gear ratios, steps 124–130 may be omitted from algorithm 100 and step 162 may be omitted from algorithm 150. In this embodiment, controller 42' has no control over the shift points of transmission 308, and may therefore actively reduce the exhaust temperature, $T_{EX}$, via the idle speed control routine 150 of FIG. 4 when the preconditions therefore are met.

Figure 14:
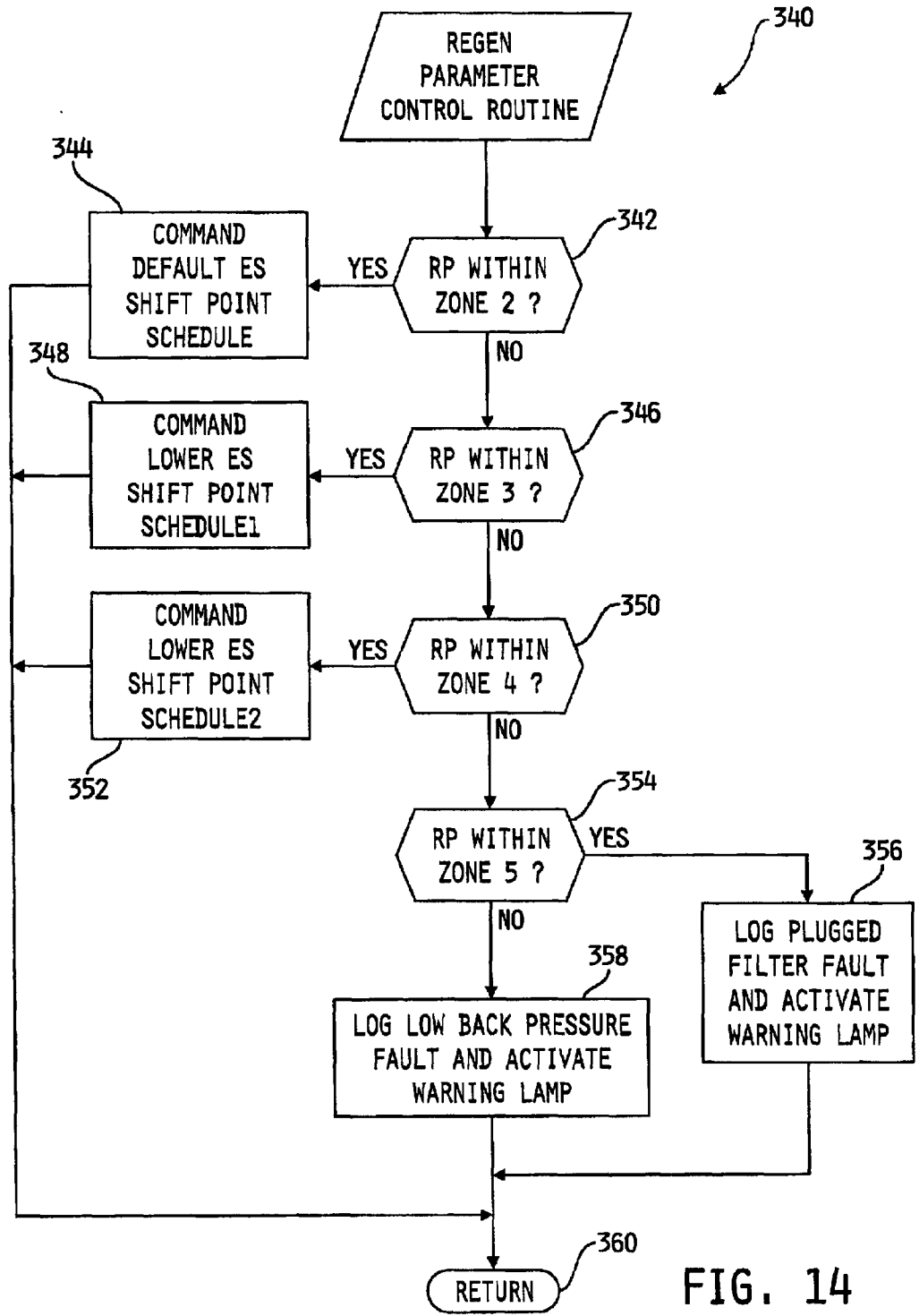
FIG. 14 is a flowchart illustrating an alternate embodiment of a software algorithm for executing the filter regeneration parameter control routine referenced in the flowchart of FIG. 2B, in accordance with the present invention.

Referring now to FIG. 2B, steps 134–138, as they relate to system 300 of FIG. 12, are executed by controller 42' in a manner identical to that described hereinabove with respect to system 10 of FIG. 1. Regarding step 140, FIG. 14 shows a flowchart illustrating one embodiment of a software algorithm 340 for executing the regeneration parameter control routine referenced at step 140 of FIG. 2B, in accordance with the present invention. As with algorithm 320, algorithm 340 will be described as being executed by controller 42', although the present invention contemplates that algorithm 340 may alternatively be executed by transmission controller 310. In any case, algorithm 340 begins at step 342 where controller 42' is operable to determine wither the regeneration parameter, RP, computed at step 136 of algorithm 100 is within zone 2 as illustrated in plot 200 of FIG. 6. If so, algorithm 340 advances to step 344 where controller 42' is operable to command the default engine speed shift point schedule described hereinabove. If, on the other hand, controller 42' determines at step 342 that the regeneration parameter, RP, is not within zone 2, algorithm execution advances to step 346 where controller 42' determines whether RP is within zone 3. If so, algorithm execution advances to step 348 where controller 42' is operable to command a first shift point schedule having lower engine speed shift points than the default engine speed shift point schedule. This has the effect of maintaining engine operation at lower engine speeds and higher engine loads than would otherwise be the case with the default engine speed shift point schedule, thereby increasing the temperature of exhaust gas produced by engine 12 to promote proper regeneration of particulate filter 38. If, at step 346, controller 42' determines that RP is not within zone 3, algorithm execution advances to step 350 where controller 42' determines whether RP is within zone 4. If so, algorithm execution advances to step 352 where controller 42' is operable to command a second shift point schedule having lower engine speed shift points than the first shift point schedule of step 348. This has the effect of maintaining engine operation at still lower engine speeds and higher engine loads than would otherwise be the case with the first shift point schedule, thereby increasing further the temperature of exhaust gas produced by engine 12 to promote proper regeneration of particulate filter 38. If, on the other hand, controller 42' determines at step 350 that RP is not within zone 4, algorithm execution advances to step 354 where controller 42' is operable to determine whether RP is within zone 5. If so, this is indicative of undesirably high back pressure and algorithm execution advances to step 356 where controller 42' is operable to log a plugged filter fault within memory 45 and activate an appropriate one or more of the warning lamps 48 via the diagnostic output DIAG. If, on the other hand, controller 42' determines that RP is not within zone 5 at step 354, then RP must be within zone 1 which is indicative of an undesirably low back pressure value. In this case, algorithm execution advances to step 358 where controller 42' is operable to log a low back pressure fault within memory 45, and to activate an appropriate one or more of the warning lamps 48. Algorithm 340 advances from steps 344, 348, 352, 356 and 358 to step 360 where algorithm execution is returned back to step 140 of algorithm 100.

Figure 15:
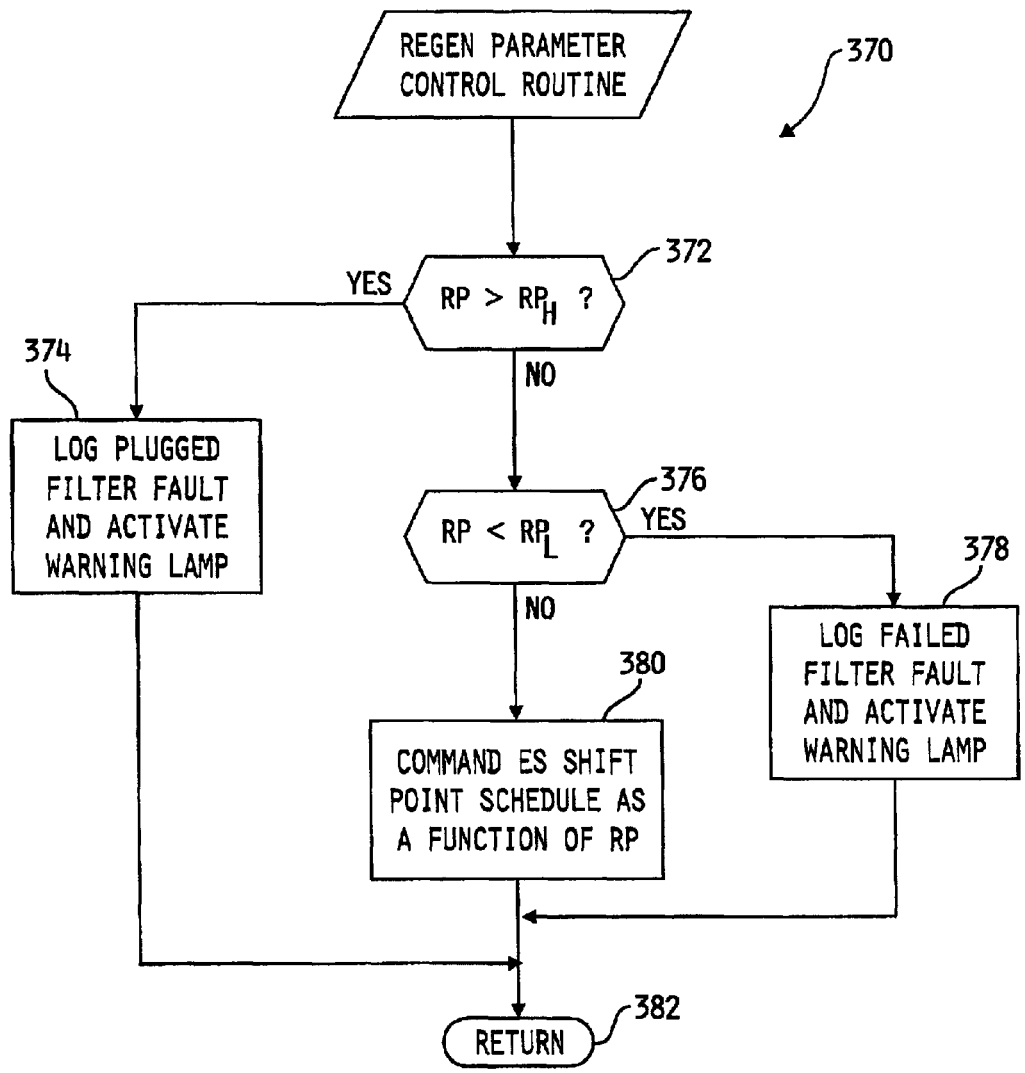
FIG. 15 is a flowchart illustrating another alternate embodiment of a software algorithm for executing the filter regeneration parameter control routine referenced in the flowchart of FIG. 2B, in accordance with the present invention.
Figure 16:
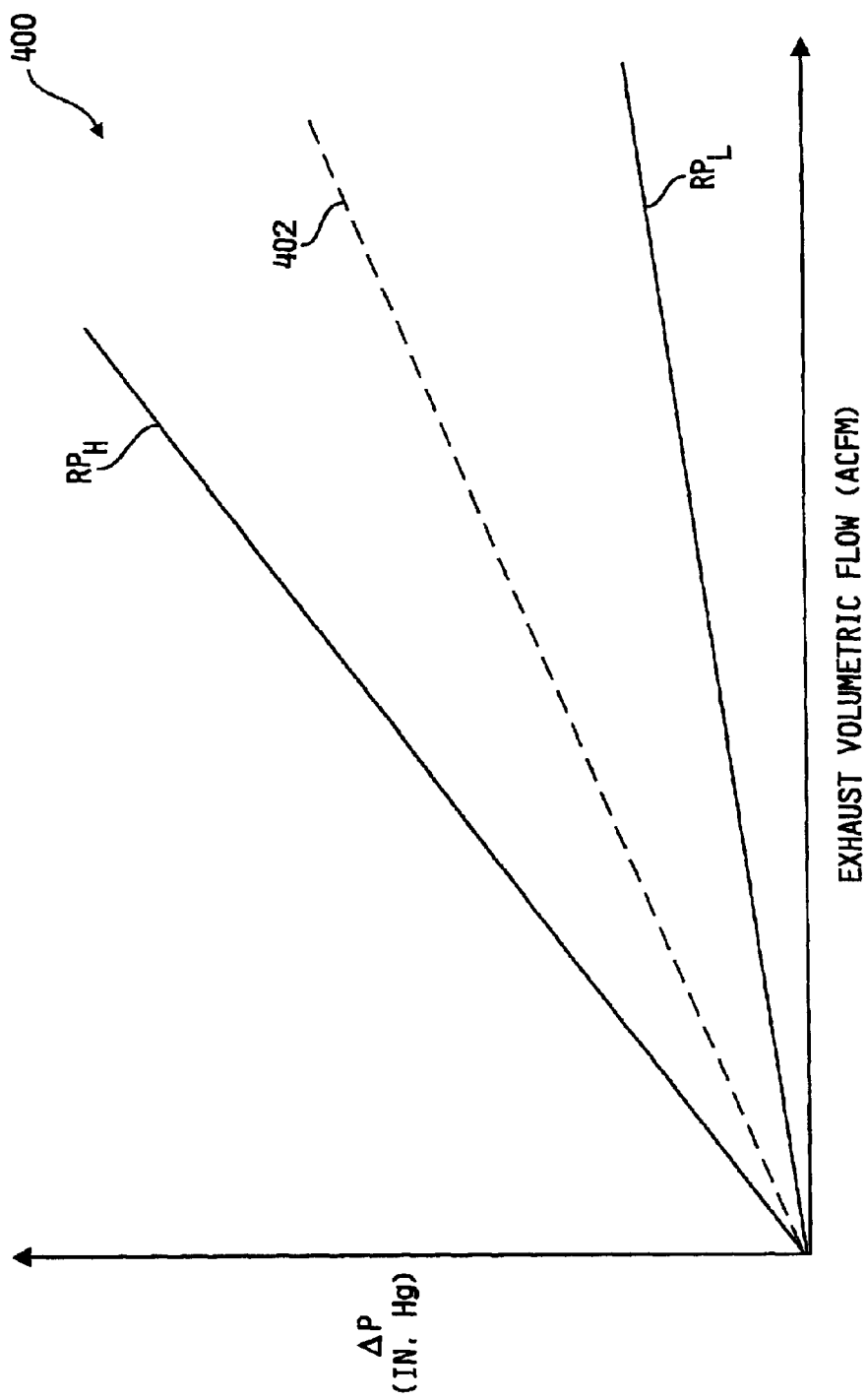
FIG. 16 is a plot of pressure differential across the particulate filter vs. exhaust volumetric flow defining an operating region of a filter regeneration parameter defined thereby, in accordance with the present invention.

It should be understood that the regeneration parameter zone control strategies just described with respect to FIGS. 6 and 14 represent only one illustrative implementation of a general regeneration parameter-based control strategy for controlling engine exhaust gas temperature, and that the present invention contemplates other regeneration parameter-based strategies. For example, plot 200 may alternatively be sub-divided into more or less zones than are illustrated in FIG. 6, and control strategies of the type just described with respect to FIG. 14 implemented to address each such zone. Alternatively still, the regeneration parameter space defined as a function of $\Delta P$ and EVF may be partitioned as illustrated in the plot 400 of FIG. 16. In this embodiment, plot 400 defines a low regeneration parameter limit $RP_L$ and a high regeneration parameter limit $RP_H$, and a regeneration parameter space therebetween in which the engine speed shift point schedule(s) of transmission 302 may be modified. For example, referring to FIG. 15, one preferred embodiment of a software algorithm 370 for executing such an alternate engine speed shift point control strategy, in accordance with the present invention, is shown. Algorithm 370 begins at step 372 where controller 42' is operable to compare the computed regeneration parameter, RP, with the high regeneration parameter limit $RP_H$. If, at step 372, RP is greater than $RP_H$, this is indicative of undesirably high back pressure and algorithm execution advances to step 374 where controller 42' is operable to log a plugged filter fault within memory 45 and activate an appropriate one or more of the warning lamps 48 via the diagnostic output DIAG. If, on the other hand, controller 42' determines at step 372 that RP is not greater than $RP_H$, algorithm execution advances to step 376 where controller 42' is operable to compare the regeneration parameter, RP, with the low regeneration parameter limit $RP_L$. If, at step 376, RP is less than $RP_L$, this is indicative of an undesirably low back pressure value. In this case, algorithm execution advances to step 378 where controller 42' is operable to log a low back pressure fault within memory 45, and to activate an appropriate one or more of the warning lamps 48.

If, at step 376, controller 42' determines that RP is not less than $RP_L$, algorithm execution advances to step 380 where controller 42' is operable to command one or more engine speed shift point schedules as a function of RP. For example, the regeneration parameter space of plot 400 defined between $RP_L$ and $RP_H$ may be partitioned into two regions, as shown by dashed-line 402. If RP is below line 402, controller 42' is operable to command the default engine speed shift point schedule and if RP is above line 402, controller 42' is operable to command a shift point schedule having lower engine speed shift points than would normally occur with the default engine speed shift point schedule.

Those skilled in the art will recognize that the regeneration parameter space of plot 400 defined between $RP_L$ and $RP_H$ may alternatively be partitioned into any number of regions wherein controller 42' is operable to command different shift point schedules for each region, wherein the engine speeds at which the transmission shift points are commanded are generally a function of the region in which the current value of RP is located. Any such alternative control strategies are intended to fall within the scope of the present invention While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, the present invention contemplates that transmission 302 illustrated and described hereinabove with respect to FIG. 12 may alternatively be a manual transmission having only manually selectable gear ratios. In this embodiment, steps 322 and 332 of algorithm 320, steps 344, 348 and 352 of algorithm 340, and step 380 of algorithm 370 may be modified such that engine controller 42' (or transmission controller 310 if one is included with transmission 302) is operable to encourage up or down shifting of transmission at desired engine speed shift points by activating one or more of the warning lamps 48 or other indicator(s) in view of the vehicle operator. In this embodiment, proper regeneration of the particulate filter 38 may be accomplished by notifying the vehicle operator of appropriate times to up/down shift based on the control concepts just described. Such modifications to the foregoing algorithms would be a mechanical step for a skilled engine software developer.

What is claimed is:

1. System for controlling particulate filter temperature, the system comprising:

an internal combustion engine producing exhaust gas at an exhaust gas outlet;

a particulate filter having an filter inlet fluidly coupled to said exhaust outlet and a filter outlet;

means for determining a temperature of said particulate filter; and a control circuit controlling rotational speed of said engine between an idle speed and a maximum speed, said control circuit increasing said idle speed from a first idle speed value to a second higher idle speed value if said temperature of said particulate filter exceeds a first temperature to thereby cool said particulate filter by increasing exhaust gas flow therethrough and decreasing said idle speed from said second idle speed value back to said first idle speed value if said temperature of said particulate filter drops below a second temperature less than said first temperature, said control circuit operable to log a fault code within a memory in communication with said control circuit if said temperature of said particulate filter exceeds a third temperature greater than said first temperature.

2. System for controlling particulate filter temperature, the system comprising:

an internal combustion engine producing exhaust gas at an exhaust gas outlet;

a particulate filter having an filter inlet fluidly coupled to said exhaust outlet and a filter outlet;

means for determining a temperature of said particulate filter; and a control circuit controlling rotational speed of said engine between an idle speed and a maximum speed, said control circuit increasing said idle speed from a first idle speed value to a second higher idle speed value if said temperature of said particulate filter exceeds a first temperature to thereby cool said particulate filter by increasing exhaust gas flow therethrough and decreasing said idle speed from said second idle speed value back to said first idle speed value if said temperature of said particulate filter drops below a second temperature less than said first temperature, said control circuit operable to activate a warning indicator if said temperature of said particulate filter exceeds a third temperature greater than said first temperature.

3. The system of claim 1 wherein the system is part of a hybrid engine-electric vehicle configured to drive the vehicle according to a ratio of electric power produced by an electric motor and engine output power produced by said engine.

4. System for controlling particulate filter temperature, the system comprising:

an internal combustion engine producing exhaust gas at an exhaust outlet;

a particulate filter having a filter inlet fluidly coupled to said exhaust outlet and a filter outlet;

means for determining a pressure differential between said filter inlet and said filter outlet;

means for determining a volumetric flow rate of said exhaust gas entering said filter inlet;

a temperature sensor producing a temperature signal indicative of exhaust gas temperature exiting said filter outlet; and a control circuit determining a regeneration parameter as a function of said pressure differential and said volumetric flow rate, said control circuit responsive to said regeneration parameter falling within a predefined range of regeneration parameter values to control said particulate filter temperature by monitoring said temperature signal and commanding reduced engine rotational speeds along lines of constant engine output power to thereby increase said exhaust gas temperature and therefore said temperature of said particulate filter if said temperature signal is not greater than a regeneration temperature for at least a predefined portion of one of a temperature signal monitoring time period and a number of measurements of said temperature signal.

5. The system of claim 4 wherein the system is part of a hybrid engine-electric vehicle configured to drive the vehicle according to a ratio of electric power produced by an electric motor and engine output power produced by said engine.

6. The system of claim 4 further including a memory unit in communication with said control circuit, said control circuit responsive to said regeneration parameter falling within a predefined range of regeneration parameter values to log a corresponding fault code within said memory unit.

7. The system of claim 6 wherein said control circuit is further responsive to said regeneration parameter falling within said predefined range of regeneration parameters to activate a corresponding warning light.

8. System for controlling particulate filter temperature, the system comprising:

an internal combustion engine producing exhaust gas at an exhaust outlet;

an electric motor responsive to electrical energy provided by a rechargeable energy source to produce electric power in a hybrid engine-electric vehicle configured to drive the vehicle according to a ratio of electric power produced by said electric motor and engine output power produced by said engine;

a generator responsive to said engine output power to recharge said rechargeable energy source;

a particulate filter having a filter inlet fluidly coupled to said exhaust outlet and a filter outlet;

means for determining a pressure differential between said filter inlet and said filter outlet;

means for determining a volumetric flow rate of said exhaust gas entering said filter inlet; and a control circuit controlling said ratio of electrical power and engine output power and determining a regeneration parameter as a function of said pressure differential and said volumetric flow rate, said control circuit responsive to said regeneration parameter falling within a predefined range of regeneration parameter values to control said temperature of said particulate filter by periodically increasing said ratio of said electrical power and said engine power to facilitate discharging of said energy source so that increased engine output power is then produced to recharge said energy source, said increased engine output power resulting in an increase in temperature of said exhaust gas and therefore an increase in said temperature of said particulate filter.

9. The system of claim 8 further including a memory unit in communication with said control circuit, said control circuit responsive to said regeneration parameter falling within a predefined range of regeneration parameter values to log a corresponding fault code within said memory unit.

10. The system of claim 9 wherein said control circuit is further responsive to said regeneration parameter falling within said predefined range of regeneration parameters to activate a corresponding warning light.

11. System for controlling particulate filter temperature, the system comprising:

an internal combustion engine producing exhaust gas at an exhaust outlet;

an electric motor having a generator coupled to a drive axle in a hybrid engine-electric vehicle configured to drive the vehicle according to a ratio of electric power produced by said electric motor and engine output power produced by said engine, said electric motor responsive in a motor mode to electrical energy provided by a rechargeable energy source to drive at least one wheel coupled to said drive axle and in a generator mode to torque produced by said drive axle to recharge said rechargeable energy source with said generator;

a particulate filter having a filter inlet fluidly coupled to said exhaust outlet and a filter outlet;

means for determining a pressure differential between said filter inlet and said filter outlet;

means for determining a volumetric flow rate of said exhaust gas entering said filter inlet; and a control circuit determining an acceleration value indicative of vehicle acceleration and determining a regeneration parameter as a function of said pressure differential and said volumetric flow rate, said control circuit responsive to said regeneration parameter falling within a predefined range of regeneration parameter values to control said temperature of said particulate filter by inhibiting recharging of said energy source by said electric motor operating in said generator mode if said acceleration value is less than an acceleration threshold value so that increased engine output power is then produced to recharge said energy source, said increased engine output power resulting in an increase in temperature of said exhaust gas and therefore an increase in said temperature of said particulate filter.

12. The system of claim 11 further including a memory unit in communication with said control circuit, said control circuit responsive to said regeneration parameter falling within a predefined range of regeneration parameter values to log a corresponding fault code within said memory unit.

13. The system of claim 12 wherein said control circuit is further responsive to said regeneration parameter falling within said predefined range of regeneration parameters to activate a corresponding warning light.

14. System for controlling particulate filter temperature, the system comprising:

an internal combustion engine producing exhaust gas at an exhaust outlet;

a particulate filter having a filter inlet fluidly coupled to said exhaust outlet and a filter outlet;

means for determining a pressure differential between said filter inlet and said filter outlet;

means for determining a volumetric flow rate of said exhaust gas entering said filter inlet; and a control circuit determining a regeneration parameter as a function of said pressure differential and said volumetric flow rate, and defining a number of boundaries each as a different function of said differential pressure of said volumetric flow rate, said control circuit controlling temperature of said particulate filter as a function of said regeneration parameter and of said number of boundaries.

15. The system of claim 14 further including a memory unit having a map stored therein defining said number of boundaries, said control circuit defining said number of boundaries by extracting said map from said memory unit.

16. The system of claim 14 further including a memory unit, said control circuit responsive to said regeneration parameter falling within a first regeneration region bounded by an axis of zero-valued volumetric flow rates of exhaust gas entering said filter inlet and an adjacent one of said number of boundaries to log a low back pressure fault within said memory unit.

17. The system of claim 16 wherein said control circuit is further responsive to said regeneration parameter falling within said first regeneration region to activate a warning light.

18. The system of claim 16 further including a temperature sensor producing a temperature signal indicative of exhaust gas temperature exiting said filter outlet;

wherein said control circuit is responsive to said regeneration parameter falling within a second regeneration region bounded by said first regeneration region and an adjacent one of said number of boundaries to execute a first control strategy to control said temperature of said particulate filter by monitoring said temperature signal and commanding reduced engine rotational speeds along lines of constant engine output power to thereby increase temperature of said exhaust gas and therefore said temperature of said particulate filter if said temperature signal is not greater than a regeneration temperature for at least a predefined portion of one of a temperature signal monitoring time period and a number of measurements of said temperature signal.

19. The system of claim 18 wherein said electric motor is responsive to electrical energy provided by a rechargeable energy source to produce said electrical power, the system further including a first generator responsive to engine output power to recharge said energy source;

and wherein said control circuit is operable to control said ratio of electrical power and engine output power, said control circuit responsive to said regeneration parameter falling within a third regeneration region bounded by said second regeneration region and an adjacent one of said number of boundaries to execute said first control strategy and to execute a second control strategy operable to control said temperature of said particulate filter by periodically increasing said ratio of said electrical power and said engine power to facilitate discharging of said energy source so that increased engine output power is then produced to recharge said energy source, said increased engine output power resulting in an increase in temperature of said exhaust gas and therefore an increase in said temperature of said particulate filter.

20. The system of claim 19 wherein said electric motor includes a second generator coupled to a drive axle of said vehicle, said electric motor responsive in a motor mode to electrical energy provided by a rechargeable energy source to drive at least one wheel coupled to said drive axle, and in a generator mode to torque produced by said drive axle to recharge said energy source with said second generator;

and wherein said control circuit is operable to determine an acceleration value indicative of vehicle acceleration, said control circuit responsive to said regeneration parameter falling within a fourth regeneration region bounded by said third regeneration region and an adjacent one of said number of boundaries to execute said first and second control strategies and to execute a third control strategy to control said temperature of said particulate filter by inhibiting recharging of said energy source by said electric motor operating in said generator mode if said acceleration value is less than an acceleration threshold value so that increased engine output power is then produced to recharge said energy source, said increased engine output power resulting in an increase in temperature of said exhaust gas and therefore an increase in said temperature of said particulate filter.

21. The system of claim 20 wherein said control circuit responsive to said regeneration parameter falling within a fifth regeneration region bounded by said fourth regeneration region and an axis of zero-valued pressure differentials between said inlet and said outlet of said particulate filter to log a plugged particulate filter fault within said memory unit.

22. The system of claim 21 wherein said control circuit is further responsive to said regeneration parameter falling within said fifth regeneration region to activate a warning light.

23. The system of claim 2 wherein the system is part of a hybrid engine-electric vehicle configured to drive the vehicle according to a ratio of electric power produced by an electric motor and engine output power produced by said engine.

* * * * *